(12) United States Patent
Lindquist et al.

(10) Patent No.: US 12,454,965 B2
(45) Date of Patent: Oct. 28, 2025

(54) LANDFILL PUMP HAVING METERED CYCLING

(71) Applicant: Q.E.D. Environmental Systems, Inc., Dexter, MI (US)

(72) Inventors: Michael K. Lindquist, Plymouth, MI (US); Hunter C. Anstadt, Ann Arbor, MI (US); Mark T. Weinberger, Mounds View, MN (US); William C. Allen, III, Ypsilanti, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/960,854

(22) Filed: Nov. 26, 2024

(65) Prior Publication Data
US 2025/0092884 A1    Mar. 20, 2025

Related U.S. Application Data

(63) Continuation of application No. PCT/US2024/023589, filed on Apr. 8, 2024.

(60) Provisional application No. 63/458,187, filed on Apr. 10, 2023.

(51) Int. Cl.
| | |
|---|---|
| *F04F 1/08* | (2006.01) |
| *E21B 43/12* | (2006.01) |
| *F04B 47/04* | (2006.01) |
| *F04B 53/10* | (2006.01) |
| *B09B 1/00* | (2006.01) |
| *F16K 31/20* | (2006.01) |

(52) U.S. Cl.
CPC .............. *F04F 1/08* (2013.01); *E21B 43/121* (2013.01); *E21B 43/129* (2013.01); *F04B 47/04* (2013.01); *B09B 1/006* (2013.01); *F16K 31/20* (2013.01)

(58) Field of Classification Search
CPC ........ F04F 1/08; E21B 43/121; E21B 43/129; F04B 47/04; B09B 1/06; F16K 31/20
USPC ......................................... 417/131, 132, 134
See application file for complete search history.

(56) References Cited

U.S. PATENT DOCUMENTS

| | | | |
|---|---|---|---|
| 5,004,405 A | 4/1991 | Breslin et al. | |
| 5,358,038 A * | 10/1994 | Edwards .................. | F04F 1/08 166/105 |
| 5,470,206 A | 11/1995 | Breslin | |
| 6,599,096 B1 * | 7/2003 | Totten ...................... | F04F 1/06 417/133 |
| 9,587,483 B2 | 3/2017 | Ramirez et al. | |
| 10,030,651 B1 | 7/2018 | Cassel et al. | |
| 10,662,941 B2 | 5/2020 | Simpson et al. | |
| 11,261,883 B2 | 3/2022 | Schaupp et al. | |
| 11,448,238 B2 | 9/2022 | Wells et al. | |
| 11,560,786 B2 | 1/2023 | Schaupp et al. | |

(Continued)

OTHER PUBLICATIONS

International Search Report and Written Opinion for PCT Application No. PCT/US2024/023589, Dated Sep. 16, 2024, pp. 19.

(Continued)

*Primary Examiner* — Charles G Freay
(74) *Attorney, Agent, or Firm* — Kinney & Lange, P.A.

(57) ABSTRACT

A landfill well pump is pneumatically powered to pump landfill liquid from a landfill well. The landfill well pump includes a choke on the pneumatic exhaust of the pump. The choke regulates flow the driving gas out of the landfill pump, maintaining pneumatic pressure in the pump and metering inflow of landfill liquid into the pump.

17 Claims, 8 Drawing Sheets

(56) References Cited

U.S. PATENT DOCUMENTS

| | | |
|---|---|---|
| 11,603,866 B2 | 3/2023 | Schaupp et al. |
| 11,692,433 B2 | 7/2023 | Schaupp et al. |
| 12,097,542 B2 | 9/2024 | Schaupp et al. |
| 2016/0356134 A1 | 12/2016 | Ramirez et al. |
| 2018/0313369 A1 | 11/2018 | Breslin |
| 2020/0256342 A1 | 8/2020 | Colby et al. |
| 2020/0309114 A1 | 10/2020 | Schaupp et al. |
| 2020/0334515 A1 | 10/2020 | Schaupp et al. |
| 2021/0285439 A1 | 9/2021 | Schaupp et al. |
| 2022/0136381 A1 | 5/2022 | Schaupp |
| 2022/0290694 A1 | 9/2022 | Schaupp et al. |
| 2023/0193895 A1 | 6/2023 | Hayes et al. |

OTHER PUBLICATIONS

Invitation to Pay Additional Fees for PCT Application No. PCT/US2024/023589, Dated Jul. 23, 2024, pp. 16.

Operations Manual AP4+ AutoPump Controllerless System, QED Environmental Systems, Inc., 2014. Retrieved from Internet: https://www.qedenv.com/media/4krgibzo/ap4plus_full_manual.pdf.

Operations Manual Ultra 4.0 and Ultra 4.5 AutoPump, QED Environmental Systems, Inc., 2021. Retrieved from Internet: https://www.qedenv.com/media/oesiucln/95358_ap4_manual.pdf.

* cited by examiner

LANDFILL PUMP HAVING METERED CYCLING

CROSS-REFERENCE TO RELATED APPLICATION(S)

This application is a continuation of PCT International Application No. PCT/US2024/023589 filed Apr. 8, 2024, for "LANDFILL PUMP HAVING METERED CYCLING", which in turn claims the benefit of U.S. Provisional Application No. 63/458,187 filed Apr. 10, 2023 and entitled "LANDFILL PUMP HAVING METERED CYCLING," the disclosures of which are hereby incorporated by reference in their entireties.

BACKGROUND

The present disclosure concerns landfill pumps. More particularly, the present disclosure concerns pneumatically powered landfill pumps that are partially or fully submerged in liquid within a landfill well bore.

Landfill pumps are disposed within landfill well bores at locations around landfills. The landfill pumps are configured to pump landfill liquid from the landfill well bore. The landfill liquid can be costly to collect and properly dispose of due to the contaminated nature of the landfill liquid. The supply of compressed gas provided to the landfill pump to cause pumping by the landfill pump and the exhaust of compressed gas from the landfill pump is regulated to control outflow from the pumps. Such regulation is typically conducted by way of needle valves that are disposed on the pneumatic lines at locations above the surface so the valves are accessible to an operator. Such valves require frequent adjustment to maintain desired flow, such as due to changing environmental conditions (e.g., moisture levels, liquid levels in the landfill, temperature, etc.) which can be costly and time consuming.

SUMMARY

According to an aspect of the disclosure, a landfill pump for pumping a liquid out of a wellbore in a landfill includes a case; a pump chamber located at least partially within the case; a liquid inlet, the liquid inlet configured to permit the liquid to flow from outside of the landfill pump into the pump chamber; a liquid outlet channel through which the liquid is discharged; a valve assembly configured to regulate flow of gas into the pump chamber to force the liquid within the chamber out through the liquid outlet; and a pneumatic outlet channel configured to vent the pneumatic gas from the chamber, wherein a choke is located along the pneumatic outlet channel to slow cycling of the landfill pump by slowing egress of the gas from the pump chamber and consequently slowing ingress of the liquid into the pump chamber.

According to an additional or alternative aspect of the disclosure, a landfill pump for pumping a liquid out of a wellbore in a landfill includes a case; a pump chamber located at least partially within the case; a manifold disposed at a top end of the case; a liquid inlet, the liquid inlet configured to permit the liquid to flow from outside of the landfill pump within the wellbore and into the pump chamber; a liquid outlet channel at least partially formed through the manifold and through which the liquid is discharged; a valve assembly configured to regulate flow of compressed gas into the pump chamber to force the liquid within the chamber out through the liquid outlet; and a pneumatic outlet channel configured to vent the pneumatic gas from the chamber, wherein a choke is located along the pneumatic outlet channel to slow cycling of the landfill pump by slowing egress of the gas from the pump chamber and consequently slow ingress of the liquid into the pump chamber. The choke is formed in a bleed piece connected to the manifold.

According to another additional or alternative aspect of the disclosure a landfill pump for pumping a liquid out of a wellbore in a landfill includes a case; a pump chamber located at least partially within the case; a manifold disposed at a top end of the case; a liquid inlet, the liquid inlet configured to permit the liquid to flow from outside of the landfill pump within the wellbore and into the pump chamber; a liquid outlet channel through which the liquid is discharged; a valve assembly configured to regulate flow of compressed gas into the pump chamber to force the liquid within the chamber out through the liquid outlet; and a pneumatic outlet channel at least partially formed through the manifold, the pneumatic outlet channel configured to vent the pneumatic gas from the chamber, wherein a choke is located along the pneumatic outlet channel to slow cycling of the landfill pump by slowing egress of the gas from the pump chamber and consequently slowing ingress of the liquid into the pump chamber, the choke formed as a bore through structure of the manifold.

According to yet another additional or alternative aspect of the disclosure, a landfill pump for pumping a liquid out of a wellbore in a landfill includes a case; a pump chamber located at least partially within the case; a liquid inlet configured to permit the liquid to flow from outside of the landfill pump within the wellbore and into the pump chamber; a liquid outlet channel through which the liquid is discharged; a valve assembly configured to regulate flow of compressed gas into the pump chamber to force the liquid within the chamber out through the liquid outlet; a pneumatic inlet channel configured to provide the compressed gas to the pump chamber; a pneumatic outlet channel configured to vent the compressed gas from the chamber; a float configured to shift axially along a pump axis to actuate the valve assembly between a fill state in which the pneumatic inlet channel is fluidly disconnected from the pump chamber, and a discharge state in which the pneumatic inlet channel is fluidly connected to the pump chamber; a discharge pipe having at least one port formed therethrough, the discharge pipe configured to convey the liquid to the liquid outlet; and a control rod interfacing with the float, the control rod including an upper stop defining an upward limit of travel for the float along the control rod and a lower stop defining a downward limit of travel for the float along the control rod. The float is configured to cause the control rod to actuate the valve assembly to the discharge state by the upper stop and the float is configured to cause the control rod to actuate the valve assembly to the fill state by the lower stop. The pump chamber includes an evacuation chamber disposed axially between the lower stop and the at least one port, the evacuation chamber having a first axial length and the pump chamber having a second axial length between the at least one port and the liquid outlet. The first axial length is at least one quarter of the second axial length with the float at the downward limit of travel and the valve assembly in the fill state to provide volume between the float and the at least one port for the compressed gas admitted to the pump chamber with the valve assembly in the discharge state to expand and continue driving the liquid out from the pump chamber after actuation of the valve assembly to the fill state.

According to yet another additional or alternative aspect of the disclosure, a method of cycling a landfill pump configured to pump liquid from within a wellbore of a landfill includes admitting a flow of compressed gas into the pump chamber from a pneumatic inlet channel of the landfill pump with a valve assembly of the landfill pump in a discharge state, the compressed gas driving liquid downward within the pump chamber down and then up a dispense tube and out through a liquid outlet of the landfill pump; actuating the valve assembly to a fill state in which the flow of compressed gas to the pump chamber is shut off; and restricting an outflow of the compressed gas from the pump chamber by a choke disposed within a pneumatic outlet channel of the landfill pump to slow cycling of the landfill pump by slowing egress of the compressed gas from the pump chamber and consequently slowing ingress of the liquid into the pump chamber.

According to yet another additional or alternative aspect of the disclosure, a method of cycling a landfill pump configured to pump liquid from within a wellbore of a landfill includes raising a float within a pump chamber of the landfill pump to an upper travel limit to actuate a valve assembly to a discharge state by a control rod; admitting a flow of compressed gas into the pump chamber from a pneumatic inlet channel of the landfill pump with the valve assembly in the discharge state, the compressed gas driving liquid within the pump chamber down and into a dispense tube through at least one port of the dispense tube and then up the dispense tube and out through a liquid outlet of the landfill pump; stopping downward travel of the float with a lower stop along the control rod at a lower travel limit of the float, the float causing the control rod to actuate the valve assembly to a fill state in which the flow of compressed gas to the pump chamber is shut off, wherein the lower stop stops downward travel of the float such that an expansion chamber having a first axial length between the lower travel limit and the at least one port is formed within the pump chamber; and restricting an outflow of the compressed gas from the pump chamber by a choke disposed within a pneumatic outlet channel of the landfill pump such that compressed gas within the pump chamber continues to expand with the valve assembly in the fill state such that the landfill pump continues to output the liquid with the valve assembly in the fill state. The first axial length is at least 20-percent of a second axial length of the pump chamber between the at least one port and an upper end of the pump chamber.

DETAILED DESCRIPTION

The present disclosure relates generally to landfill pumps. Landfill pumps are configured to pump liquid from a landfill wellbore. Such liquid could be any type of liquid which accumulates in a landfill well. Typically, such liquid is water containing leachate and/or other contaminants, which includes debris and/or can be highly corrosive on components of the pump. The environment in a landfill well can be particularly hot because of the ongoing decomposition reaction of the landfill contents. Accordingly, the landfill pumps must be made of particularly robust materials and have a design that minimizes wear, binding, and failure points.

A landfill pump is configured to regulate exhaust of driving gases from within the pump. The pump includes a choke that forms a bleed passage through which the exhaust gasses pass to exit from the pump. The choke is a constriction that slows flow of the exhaust gasses such that egress of the gas from within the pump is slowed, consequently slowing ingress of landfill liquid into the pump. The choke is disposed along a pneumatic outlet channel through which the exhaust gasses flow to exit from a pump chamber of the pump.

A landfill pump can be float actuated to cause cycling by the pump. The float can cause valving to actuate open to allow inflow of compressed gas to the pump, thereby pumping the landfill liquid from the pump. Travel of the float is both upward within the pump and downward within the pump. The float can actuate the valving closed to stop flow of compressed gas into the pump. Downward travel of the float during admission of compressed gas is restricted such that an expansion chamber is formed within the pump when the valving is closed to stop inflow of the compressed gas. Restricting travel of the float actuates the valving to a closed state sooner, allowing the compressed gas already admitted to the pump chamber to continue to expand within the expansion chamber to continue driving liquid out of the pump chamber. The expansion chamber between the float and the discharge ports allow admitted driving gas to expand while preventing the driving gas from flowing into the discharge tube and up into discharge lines that convey landfill liquid from the pump.

Components can be considered to radially overlap when those components are disposed at common axial locations along an axis. A radial line extending from the axis will extend through each of the radially overlapping components. Components can be considered to axially overlap when those components are disposed at common radial and circumferential locations relative to an axis such that an axial line parallel to the axis extends through the axially overlapping components. Components can be considered to circumferentially overlap when aligned about the axis, such that a circle centered on the axis passes through the circumferentially overlapping components.

Figure 1:
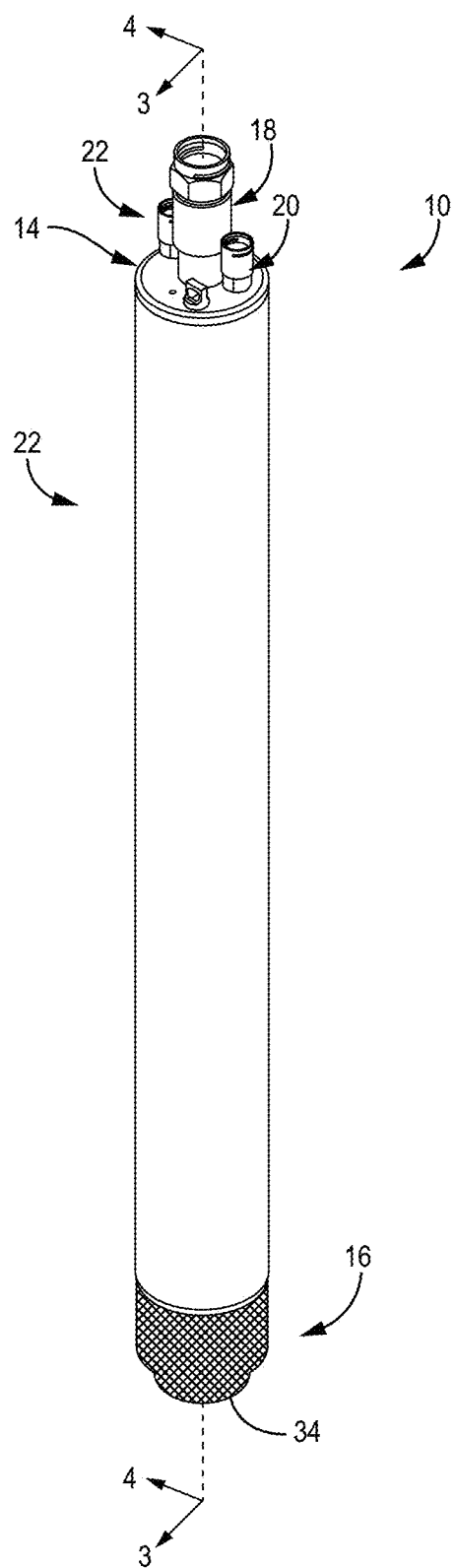
FIG. 1 is an isomeric view of a landfill well pump.
Figure 2:
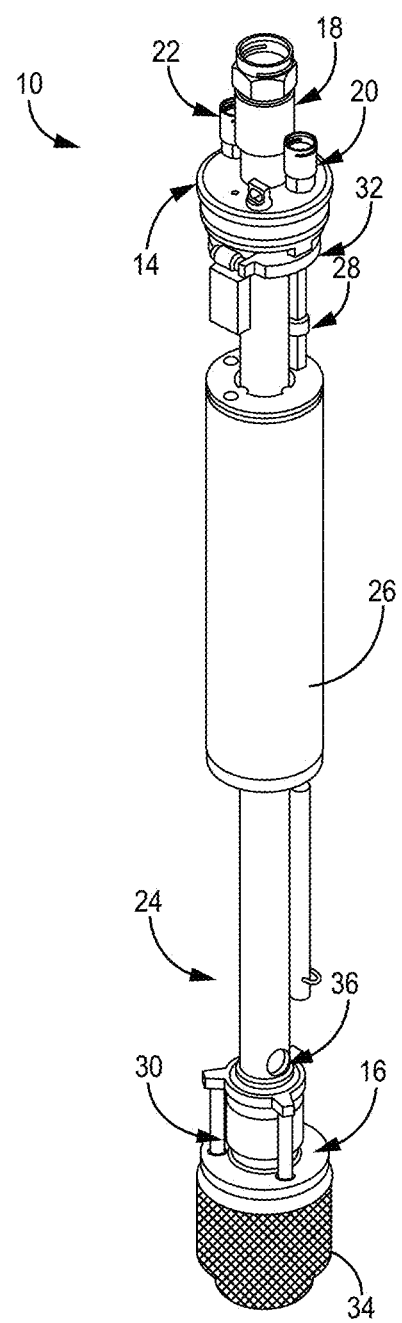
FIG. 2 is an isometric view of a landfill well pump with an outer casing removed to expose internal components of the landfill well pump.

FIG. 1 is an isomeric view of landfill pump 10. FIG. 2 is an isometric view of landfill pump 10 with outer case 12 removed to expose internal components of landfill pump 10. FIGS. 1 and 2 are discussed together. Outer case 12, manifold 14, liquid inlet 16, liquid outlet 18, pneumatic inlet 20, pneumatic outlet 22, discharge pipe 24, float 26, control rod 28, liquid inlet valve 30, valve assembly 32, and filter 34 of landfill pump 10 are shown. Discharge pipe 24 includes ports 36.

Landfill pump 10 is typically lowered into a wellbore of a landfill on a cable assembly. The cable assembly can include a hose supplying pressurized gas supplied from the surface. The cable assembly can further include a discharge hose that carries discharge liquid from the landfill pump 10 up to the surface to be expelled into a container. Due to the narrow space inside of the wellbore, the connection points for the cable assembly are located at the top of the landfill pump 10 while a liquid inlet 16 is located on the bottom of the landfill pump 10.

Landfill pump 10 is configured to operate in serial pump cycles. Each pump cycle includes a filling phase and an evacuation phase. During the filling phase, liquid from the landfill wellbore can flow into the interior of landfill pump 10 to fill landfill pump 10 with the landfill liquid. During the evacuation phase, compressed gas is admitted into the interior of landfill pump 10 to drive the liquid within landfill pump 10 out of landfill pump 10. The landfill pump 10 transitions back to a filling phase after completing an evacuation phase.

Case 12 defines an interior pump chamber 38 (best seen in FIGS. 3A and 4) within the landfill pump 10. The case 12 forms an exterior of the landfill pump 10. The case 12 can be fully or partially submerged in landfill liquid with the landfill pump 10 disposed within a landfill wellbore. Case 12 can be a cylindrical tube made of metal, polymer, epoxy composite, and/or other material.

Liquid inlet 16 is disposed at a lower end of landfill pump 10. Filter 34 is disposed at liquid inlet 16. Filter 34 is an exterior filter. For example, filter 34 can be in the form of a screen, which filters out large debris in the liquid preventing the debris from entering the landfill pump 10. The landfill pump 10 is at least partially submerged in liquid within the landfill wellbore such that the liquid inlet 16 is underneath the surface of the liquid and able to readily bring the surrounding liquid into the landfill pump 10.

Liquid outlet 18 is disposed at an opposite end of landfill pump 10 from liquid inlet 16. Liquid outlet 18 is disposed at a top end of landfill pump 10 in the example shown. The liquid outlet 18 can connect with a discharge hose that routes liquid discharge from the landfill pump 10 up to the surface.

On the top end of the landfill pump 10 is a pneumatic inlet 20. Pneumatic inlet 20 can include a fitting for attaching to a hose supplying gas under pressure to the landfill pump 10. Such a pneumatic supply hose can extend to the surface where the supply of pressurized gas is located. On the top end of the landfill pump 10 is a pneumatic outlet 22. Pneumatic outlet 22 can connect with a fitting of a pneumatic exhaust hose that extends to the surface to capture exhaust gas. Alternatively, the pneumatic outlet 22 can exhaust gas directly into the wellbore without a hose.

Manifold 14 is disposed at the top end of landfill pump 10. In the example shown, the case 12 extends around part of manifold 14 and seals with manifold 14. The manifold 14 interfaces with a top end of the case 12 in the example shown. The liquid outlet 18, pneumatic inlet 20, and pneumatic outlet 22 of landfill pump 10 can be formed as part of or otherwise extend from or be supported by the manifold 14, though it is understood that other configurations are possible. The manifold 14 can be made of metal, among other options. For example, the manifold 14 can be formed from stainless steel.

Discharge pipe 24 is fluidly connected to liquid outlet 18 to provide landfill liquid to liquid outlet 18. In the example shown, the discharge pipe 24 interfaces with the manifold 14 and extends from the manifold 14. For example, the discharge pipe 24 can be directly connected to the manifold 14, such as by interfaced threading, a press fit connection, a bayonet connection, among other options. In some examples, the discharge pipe 24 can extend through the manifold 14 and above manifold 14 to form the liquid outlet 18. Discharge pipe 24 extends from a bottom end of the landfill pump 10 to the top end of the landfill pump 10. Discharge pipe 24 can extend between liquid inlet valve 30 and manifold 14.

Ports 36 are formed through discharge pipe 24. It is understood that discharge pipe 24 can include one or more ports 36. Ports 36 provide passages for landfill liquid to flow from the pump chamber 38 within case 12 into the discharge pipe 24. Ports 36 are disposed at a bottom end of the discharge pipe 24. Ports 36 are located at the end of discharge pipe 24 opposite the manifold 14. Ports 36 extend radially relative to the pump axis PA that discharge pipe 24 extends along.

Valve assembly 32 is actuatable between the fill state associated with a filling phase of landfill pump 10 and the dispense state associated with an evacuation phase of landfill pump 10. In some examples, valve assembly 32 is configured as a rocker valve which is tripped between a first state and a second state. In the fill state the pneumatic inlet 20 is fluidly disconnected from the interior of landfill pump 10 and the pneumatic outlet 22 is fluidly connected to the interior of landfill pump 10 such that compressed gas can be exhausted through pneumatic outlet 22. In the discharge state the pneumatic inlet 20 is fluidly connected to the interior of landfill pump 10 such that compressed gas can enter into landfill pump 10 to drive liquid out down within landfill pump 10 and then up discharge pipe 24 and out through liquid outlet 18. In some examples, pneumatic outlet 22 is fluidly disconnected from the interior of landfill pump 10 with valve assembly 32 in the discharge state, though it is understood that not all examples are so limited.

Float 26 is disposed at least partially around discharge pipe 24. While the example shown includes float 26, it is understood that not all examples are so limited. Float 26 can be made of a material that is less dense than the landfill liquid such that the float 26 is buoyant when partially submerged in liquid that fills the pump chamber 38. Float 26 is configured to actuate valve assembly 32 to a discharge state to admit compressed gas into the pump chamber 38 through pneumatic inlet 20. Float 26 can be configured to actuate valve assembly 32 to a fill state in which flow of compressed gas into landfill pump 10 is shut off. Float 26 can drive the valve assembly 32 control flow of compressed gas into and/or out of the landfill pump 10. For example, float 26 rising with a rising fluid level and reaching an upward travel limit can actuate the valve assembly 32 to the discharge state and the float 26 falling with a falling liquid level and reaching a lower or downward travel limit can actuate valve assembly 32 to the fill state.

Control rod 28 interfaces with float 26. Control rod 28 can extend through float 26 in some examples. Float 26 is configured to travel axially relative to the axis PA with the changing liquid level within landfill pump 10. Control rod 28 and discharge pipe 24 can guide float 26 within landfill pump 10 and limit float 26 to axial movement. Control rod 28 defines a downward end of travel for float 26. Control rod 28 can define an upward end of travel for float 26.

In the fill state a pneumatic inlet valve that controls compressed air flow from pneumatic inlet 20 and into the interior of the landfill pump 10 is closed. Upward movement of the control rod 28 trips the valve assembly 32 to the discharge state in which the pneumatic inlet 20 is fluidly connected to the interior of the landfill pump 10, transitioning the landfill pump 10 to the evacuation phase in which pressurized gas is released from the manifold 14 into the interior of landfill pump 10. Such release of pressurized gas pushes the liquid within the landfill pump 10 downward to close the liquid inlet valve 30 and force the liquid within the landfill pump 10 into the one or more ports 36 on the lower end of the discharge pipe 24 and up the discharge pipe 24 and out the liquid outlet 18. Evacuation of the liquid causes the liquid level within the landfill pump 10 to lower which correspondingly causes the float 26 to move downward. In some examples, float 26 can cause control rod 28 to shift downward when float 26 reaches a downward end of travel, tripping the valve assembly 32 back to the fill state, which fluidly disconnects the pneumatic inlet 20 from the interior of landfill pump 10 to prevent further release of pressurize gas into the landfill pump 10.

With valve assembly 32 in the fill state, any remaining pressurize gas in the landfill pump 10 can evacuate through pneumatic outlet 22. With pressure within landfill pump 10 decreased, the evacuation phase ends and the landfill pump 10 transitions to the filling phase as liquid can move past the liquid inlet 16, through the liquid inlet valve 30, and into the interior of landfill pump 10 to start the pump cycle once again.

Figure 3A:
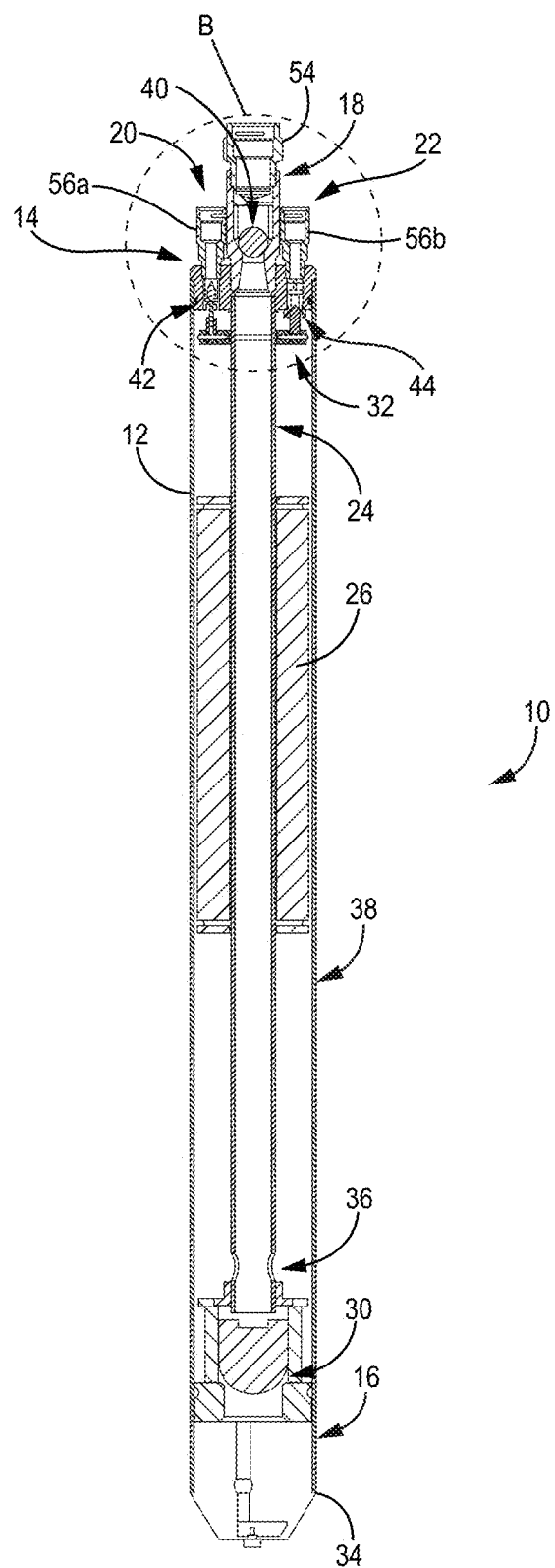
FIG. 3A is a cross-section taken along line 3-3 in FIG. 1.
Figure 3B:
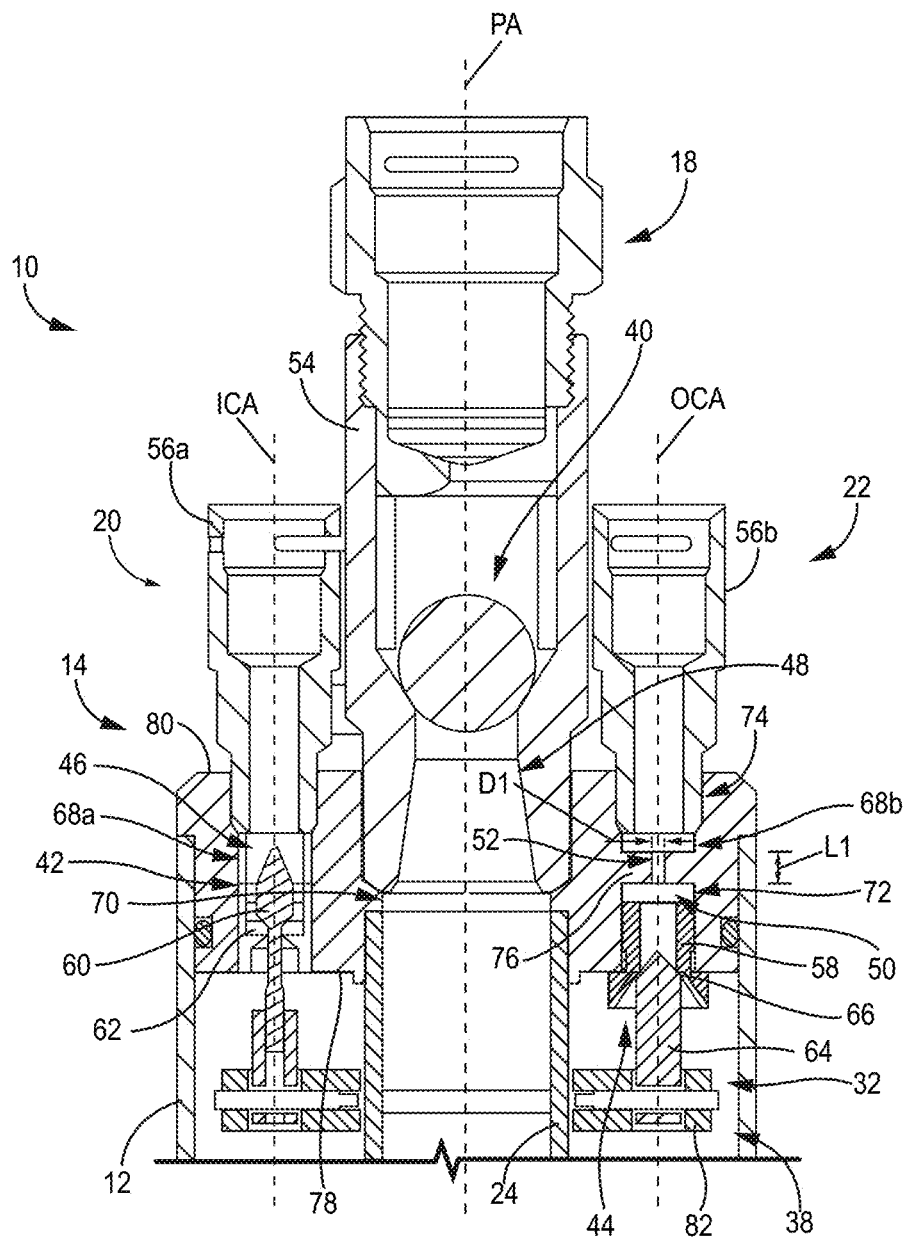
FIG. 3B is an enlarged view of detail B in FIG. 3A.

FIG. 3A is a cross-sectional view taken along line 3-3 in FIG. 1. FIG. 3B is an enlarged view of detail B in FIG. 3A. FIGS. 3A and 3B are discussed together with continued reference to FIGS. 1 and 2. Outer case 12, manifold 14, liquid inlet 16, liquid outlet 18, pneumatic inlet 20, pneumatic outlet 22, discharge pipe 24, float 26, liquid inlet valve 30, valve assembly 32, filter 34, pump chamber 38, liquid outlet valve 40, pneumatic inlet valve 42, pneumatic outlet valve 44, pneumatic inlet channel 46, liquid outlet channel 48, pneumatic outlet channel 50, choke 52, liquid fitting 54, pneumatic fitting 56a, pneumatic fitting 56b, and exhaust fitting 58 of landfill pump 10 are shown. Discharge pipe 24 includes ports 36. Liquid inlet valve 30 includes inlet valve member 60 and inlet valve seat 62. Liquid outlet valve 40 includes outlet valve member 64 and outlet valve seat 66. Manifold 14 includes pneumatic passage 68a, pneumatic passage 68b, and liquid passage 70. Pneumatic passage 68b includes outlet valve bore 72, outlet fitting bore 74, and bleed barrier 76.

Compressed gas is routed into pump chamber 38 to displace the landfill liquid into and through discharge pipe 24 and out of landfill pump 10 through liquid outlet 18. Compressed gas from pump chamber 38 is routed out from pump chamber 38 as exhaust gas. In the example shown, the compressed gas is routed into pump chamber 38 through manifold 14 and is routed out from pump chamber 38 through manifold 14. Manifold 14 is disposed at a top end of outer case 12 and interfaces with outer case 12. Manifold 14 is at least partially disposed within outer case 12 in the example shown.

Liquid inlet valve 30 is disposed at a bottom end of landfill pump 10. Liquid inlet valve 30 is configured to allow landfill liquid to flow into pump chamber 38 and prevent landfill liquid from flowing out of pump chamber 38 through liquid inlet 16. Liquid inlet valve 30 is formed as a one way check valve in the example shown. The liquid pressure in the wellbore drives the liquid from within the wellbore and through the liquid inlet valve 30 into the pump chamber 38. Liquid outlet valve 40 is disposed at a top end of landfill pump 10. In the example shown, the liquid outlet valve 40 is supported by manifold 14. The liquid outlet valve 40 is configured to allow landfill liquid to exit landfill pump 10 during the evacuation phase and is configured to close to prevent evacuated landfill liquid from backflowing into landfill pump 10. The liquid outlet valve 40 is formed as a one way check valve in the example shown. The pressure exerted on the liquid within pump chamber 38 by the compressed gas during the evacuation phase drives the liquid up the discharge pipe 24 and through the liquid outlet valve 40. The liquid outlet valve 40 returns to a closed state to prevent backflow of the liquid.

Liquid inlet 16 is disposed at a bottom end of landfill pump 10 and liquid outlet 18 is disposed at a top end of landfill pump 10. Liquid outlet channel 48 is formed through manifold 14. In the example shown, the liquid outlet channel 48 is aligned on the axis PA. The liquid outlet channel 48 extends fully through manifold 14 from a bottom side 78 of manifold 14 to a top side 80 of manifold 14. The liquid outlet channel 48 can be considered to be disposed at least partially within discharge pipe 24 and at least partially within liquid fitting 54. Liquid passage 70 is formed by one or more bores that extend into manifold 14. Discharge pipe 24 and liquid fitting 54 interface with manifold 14 within liquid passage 70.

Discharge pipe 24 is connected to manifold 14. Discharge pipe 24 is directly connected to manifold 14 at liquid passage 70. In the example shown, discharge pipe 24 extends into liquid passage 70 to interface with manifold 14. Discharge pipe 24 extends into liquid passage 70 through bottom side 78 of manifold 14. It is understood that, in some examples, discharge pipe 24 can extend fully axially through manifold 14 such that discharge pipe 24 projects through both the top side 80 and bottom side 78 of the manifold 14. In such an example the discharge pipe 24 can extend fully through liquid passage 70.

Liquid fitting 54 is connected to manifold 14. Liquid fitting 54 is directly connected to manifold 14 at liquid passage 70. In the example shown, liquid fitting 54 extends into liquid passage 70 to interface with manifold 14. Liquid fitting 54 extends into liquid passage 70 through top side 80 of manifold 14. Liquid fitting 54 is configured to connect to a hose that conveys pumped landfill liquid from the landfill pump 10 to the surface. Liquid fitting 54 is formed separately from discharge pipe 24 in the example shown, but it is understood that not all examples are so limited. For example, liquid fitting 54 can be connected to or formed by discharge pipe 24 in examples in which discharge pipe 24 extends fully axially through manifold 14. Liquid outlet valve 40 is disposed within liquid fitting 54 in the example shown.

Pneumatic inlet channel 46 is formed at least partially in manifold 14. Pneumatic inlet channel 46 extends through manifold 14 and is open through both top side 80 and bottom side 78 of manifold 14. Pneumatic inlet channel 46 provides a passage for compressed gas to enter into pump chamber 38 during the evacuation phase. Pneumatic passage 68a is formed by one or more bores within manifold 14. Pneumatic inlet channel 46 extends through pneumatic passage 68a to convey compressed gas from outside of landfill pump 10 to within pump chamber 38. The inlet valve seat 62 and the pneumatic fitting 56a are mounted in the pneumatic passage 68a.

Pneumatic fitting 56a is connected to manifold 14. Pneumatic fitting 56a is directly connected to manifold 14 in the example shown. For example, pneumatic fitting 56a can be threadedly connected to manifold 14, among other options. The pneumatic fitting 56a extends into manifold 14 through top side 80 of manifold 14. Pneumatic fitting 56a is configured to connect to a gas supply hose that conveys compressed gas to the landfill pump 10. In the example shown, pneumatic fitting 56a extends into pneumatic passage 68a to connect to manifold 14.

Pneumatic outlet channel 50 is formed through manifold 14. Pneumatic outlet channel 50 extends through manifold 14 and is open through both top side 80 and bottom side 78 of manifold 14. Pneumatic outlet channel 50 provides the flowpath for compressed gas to exit from pump chamber 38 during the filling phase. Pneumatic passage 68b is formed through manifold 14. Pneumatic passage 68b is formed by one or more bores within manifold 14. Pneumatic outlet channel 50 extends through pneumatic passage 68b to convey compressed gas from within pump chamber 38 to outside of landfill pump 10. The exhaust fitting 58 and the pneumatic fitting 56b are mounted in the pneumatic passage 68b.

Pneumatic fitting 56b is connected to manifold 14. Pneumatic fitting 56b is directly connected to manifold 14 in the example shown. For example, pneumatic fitting 56b can be threadedly connected to manifold 14 at outlet fitting bore 74, among other options. Outlet fitting bore 74 is a portion of pneumatic passage 68b open through top side of manifold 14. The pneumatic fitting 56b extends into manifold 14 through top side 80 of manifold 14. Pneumatic fitting 56b is configured to connect to a gas exhaust hose that conveys compressed gas exhausted from landfill pump 10. In some examples, pneumatic fitting 56b is not connected to an exhaust hose and pneumatic fitting 56b exhausts the gasses into the well bore. In some examples, landfill pump 10 does not include a pneumatic fitting 56b associated with pneumatic outlet channel 50, such as in examples in which landfill pump 10 is configured to exhaust gasses into the well bore.

Exhaust fitting 58 is connected to manifold 14. Exhaust fitting 58 is connected to manifold 14 at pneumatic passage 68, such as at outlet valve bore 72. Outlet valve bore 72 is open through bottom side 78 of manifold 14. For example, exhaust fitting 58 can be connected to manifold 14 at a threaded interface, among other connection options. Exhaust fitting 58 extends at least partially into manifold 14 in the example shown. Exhaust fitting 58 extends into manifold 14 through bottom side 78 of manifold 14. Exhaust fitting 58 defines a portion of the pneumatic outlet channel 50 for exhaust gasses to exit from the pump chamber 38.

The valve assembly 32 admits compressed gas into the pump chamber 38 in the discharge state and the valve assembly 32 blocks admission of compressed gas into the pump chamber 38 in the fill state. The pneumatic inlet valve 42 blocks the pneumatic inlet channel 46 during filling of liquid into the pump chamber 38 through the liquid inlet 16 and is moved to not block the pneumatic inlet channel 46 during the admission of compressed gas to the pump chamber 38 through the pneumatic inlet valve 42 to drive liquid out from the pump chamber 38 through the liquid outlet 18. Valve assembly 32 can include a pneumatic outlet valve 44 configured to block the pneumatic outlet channel 50 during admission of compressed gas to the pump chamber 38 through the pneumatic inlet valve 42 to drive liquid out from the pump chamber 38 through the liquid outlet 18. The pneumatic outlet valve 44 can be moved to not block the pneumatic outlet channel 50 during filling of liquid into the pump chamber 38 through the liquid inlet 16.

Valve assembly 32 is at least partially disposed within pump chamber 38. Assembly base 82 is disposed at least partially around discharge pipe 24 in the example shown. Assembly base 82 can be connected to discharge pipe 24, such as at a pivot in examples in which valve assembly 32 is configured as a rocker assembly. Inlet valve member 60 and outlet valve member 64 extend from assembly base 82 of valve assembly 32. Both inlet valve member 60 and outlet valve member 64 being supported by assembly base 82 facilitates simultaneous actuation of the pneumatic inlet valve 42 and the pneumatic outlet valve 44.

The interface between inlet valve member 60 and inlet valve seat 62 is formed within manifold 14 in the example shown. Inlet valve seat 62 is disposed within pneumatic passage 68a. Inlet valve member 60 extends from assembly base 82 into pneumatic passage 68a through the bottom side 78 of manifold 14. Inlet valve member 60 interfaces with inlet valve seat 62 to close pneumatic inlet valve 42. Inlet valve member 60 disengages, fully or partially, from inlet valve seat 62 to open pneumatic inlet valve 42 and admit compressed gas into pump chamber 38. The interface between inlet valve member 60 and inlet valve seat 62 is disposed within manifold 14 at a location that radially overlaps with manifold 14 along a channel axis ICA of the pneumatic passage 68a.

Outlet valve seat 66 is formed by exhaust fitting 58 in the example shown. It is understood, however, that not all examples are so limited. For example, outlet valve seat 66 can be formed by material of manifold 14 itself or by another component mounted to manifold 14.

Outlet valve member 64 extends from assembly base 82. Outlet valve member 64 can be at least partially disposed within the pneumatic outlet channel 50. Outlet valve member 64 extends into exhaust fitting 58 in the example shown. It is understood that, in some examples, outlet valve member 64 can extend into manifold 14 to radially overlap with structure of manifold 14 relative to channel axis OCA. Outlet valve member 64 interfaces with outlet valve seat 66 to close pneumatic outlet valve 44. Outlet valve member 64 disengages, fully or partially, from outlet valve seat 66 to open pneumatic outlet valve 44 and fluidly connect the pneumatic outlet channel 50 with pump chamber 38, thereby allowing compressed gas to exhaust from pump chamber 38.

Opening and closing of the pneumatic outlet valve 44 fluidly connects and disconnects the pump chamber 38 and pneumatic outlet channel 50. Gas venting from within the pump chamber 38 travels through the pneumatic outlet valve 44 and the pneumatic outlet channel 50 and out from landfill pump 10. As previously mentioned, such venting may travel from the pneumatic outlet channel 50 to a hose extending upwards, such as from pneumatic fitting 56b, or may vent directly into the wellbore. The pneumatic outlet channel 50 extends through the manifold 14 and can extend above and/or below the manifold 14, in various examples.

Pneumatic passage 68b is formed by outlet fitting bore 74, outlet valve bore 72, and choke 52 in the example shown. Choke 52 extends between and fluidly connects outlet fitting bore 74 and outlet valve bore 72. Pneumatic fitting 56b is mounted to manifold 14 at outlet fitting bore 74, such as by a threaded interface. Exhaust fitting 58 is mounted to manifold 14 at outlet valve bore 72, such as by a threaded interface. In the example shown, choke 52 is formed through and defined by structure of manifold 14 such that choke 52 is formed through structure of manifold 14. Bleed barrier 76 is disposed between outlet fitting bore 74 and outlet valve bore 72. Bleed barrier 76 narrows the pneumatic passage 68 and choke 52 is formed as a bore through the bleed barrier 76 in the example shown. It is understood, however, that not all examples are so limited. For example, choke 52 can be formed in a plug or bleed piece that is formed separate from manifold 14 and mounted to manifold 14, as discussed in more detail below.

Choke 52 is disposed in and defines a portion of the pneumatic outlet channel 50. The choke 52 is a narrowing of the pneumatic outlet channel 50. The narrowing can be greater than 50% of the pneumatic outlet channel 50 in effective diameter. The narrowing can be greater than 75% of the pneumatic outlet channel 50 in effective diameter. The narrowing can be greater than 90% of the pneumatic outlet channel 50 in effective diameter. In some examples, pneumatic outlet channel 50 can be configured to have an inner diameter along a majority of its length of at least 0.2 inches (in.) (at least 0.508 centimeters (cm)). In some examples, the pneumatic outlet channel 50 can have an inner diameter along all of its length of at least 0.2 in. (about 0.508 cm) except for along choke 52 which is narrower.

Choke 52 can be located downstream of the pneumatic outlet valve 44, though it is understood that not all examples are so limited. In the example shown, choke 52 is located within the manifold 14 but in various other examples may be mounted on or otherwise attached to the manifold 14. In the example shown, the choke 52 is formed as a bore through structure of the manifold 14.

Choke 52 inhibits, but does not stop, the flow of pressurized gas from within the pump chamber 38 out through the pneumatic outlet channel 50. As such, the choke 52 slows down the cycling of the landfill pump 10 because liquid will only enter the pump chamber 38 at near equal pressure with the pressure within the pump chamber 38. If pressurized gas remains in the pump chamber 38 after the evacuation phase, then that residual pressurized gas will slow the ingress of liquid through the liquid inlet 16 and into the pump chamber 38, thus making the filling phase of the pump cycle longer. This has the overall effect of slowing the cycling of the landfill pump 10 which can be advantageous for applications when low cycling and low flow is desired.

Choking the venting of gas from the landfill pump 10 is more advantageous than choking the inlet of pressurized gas because choking the inlet of pressurized gas would compromise the power of the landfill pump 10 during the evacuation phase of the pump cycle. Choke 52 is a fixed size passage in the example shown and is not adjustable, unlike a needle valve. The choke 52 is located at the landfill pump 10 and within the well bore. As such, the choke 52 is not subjected to the environmental conditions that cause frequent adjustment of valving controlling exhaust gas. The choke 52 thereby provides a steady outflow and cycle time for the landfill pump 10.

Choke 52 is configured to provide steady cycling for landfill pump 10. As such, landfill pump 10 outputs liquid at a steady rate, which allows for the user to better plan for capture and treatment of the pumped liquid. In some examples, choke 52 is configured such that landfill pump 10 can output liquid at rates up to about 2.5 gallons per minute (GPM). In some examples, choke 52 is configured such that landfill pump 10 can output liquid at rates up to about 1.5 GPM. It is understood, however, that choke 52 can be sized in any desired way to provide desired flow rate.

Choke 52 has length L1 and diameter D1. The length L1 of choke can be less than about 1 (in.) (about 2.54 cm). In some examples, the length L1 of choke 52 is up to about 0.5 in. (about 1.27 cm). In some examples, the length L1 of choke 52 is up to about 0.2 in. (about 0.508 cm). The diameter D1 of choke 52 is less than the length L1 of choke 52 to form the restriction that slows exhaust of gas from within pump chamber 38. In some examples, the diameter D1 of choke 52 is up to about 0.2 in. (about 0.508 cm). In some examples, the diameter D1 of choke 52 is up to about 0.1 in. (about 0.254 cm). In some examples, the diameter D1 of choke 52 is up to about 0.05 in. (about 0.127 cm). In some examples, the diameter D1 of choke 52 is up to about 0.04 in. (about 0.1016 cm). It is understood that the choke 52 can have a diameter to length ratio sized to slow exhaust of compressed gas while allowing landfill pump 10 to continue progressing through pump cycles. In some examples, the diameter to length ratio of choke 52 is about 1:5 or more, such that the length L1 is at least five times greater than the diameter D1.

During operation, landfill pump 10 operates serial pump cycles by alternating between the filling phase and the evacuation phase in each pump cycle. In the filling phase, liquid from outside the landfill pump 10, within the wellbore into which the landfill pump 10 is partially or fully submerged, flows through the liquid inlet 16 and past the liquid inlet valve 30 into the interior pump chamber 38. During the filling phase, the liquid inlet valve 30 is open. During the filling phase the pneumatic inlet valve 42 is closed and the pneumatic outlet 22 is fluidly connected to the pump chamber 38. The liquid level within the pump chamber 38 rises to partially submerge the float 26 and eventually causes the float 26 to start rising within the pump chamber 38. Rising of the float 26 trips the valve assembly 32 and actuates valve assembly 32 from a fill state associated with the filling phase to a discharge state associated with the evacuation phase.

The valve assembly 32 is actuatable between the fill state and the discharge state. In some examples, the valve assembly 32 is configured as or includes a rocker mechanism configured to be actuated by the float 26. In some examples, valve assembly 32 is configured to translate linearly relative to axis PA between the fill and exhaust states. The pneumatic inlet valve 42 is closed with valve assembly 32 in the fill state and the pneumatic outlet valve 44 is open with valve assembly 32 in the fill state. The pneumatic inlet valve 42 is open with valve assembly 32 in the discharge state and the pneumatic outlet valve 44 is closed with valve assembly 32 in the discharge state.

During the fill cycle, the pneumatic inlet valve 42 is closed and the pneumatic outlet valve 44 is open. The closed pneumatic inlet valve 42 prevents pressurized gas from flowing into pump chamber 38. The open pneumatic outlet valve 44 allows compressed gas to vent from pump chamber 38 and out through pneumatic outlet channel 50. The landfill liquid flows into pump chamber 38 through liquid inlet 16 and displaces float 26 towards valve assembly 32. Pump chamber 38 is fluidly connected to the pneumatic outlet channel 50 and gasses within pump chamber 38 can flow through the open pneumatic outlet valve 44, through choke 52, and out from landfill pump 10 through the pneumatic outlet channel 50. As discussed above, the choke 52 regulates the outflow of gasses to slow the rate of gas exhausting from pump chamber 38, thereby slowing the fill rate of landfill pump 10. As float 26 reaches its upward end of travel the valve assembly 32 is actuated to the discharge state and the pneumatic inlet valve 42 shifts to an open state and the pneumatic outlet valve 44 shifts to a closed state. Upward movement of the float 26 trips the valve assembly 32 to the dispense state in which the pneumatic inlet valve 42 is opened.

Opening of the pneumatic inlet valve 42 transitions the landfill pump 10 to the evacuation phase in which pressurized gas is released from pneumatic inlet channel 46 into pump chamber 38. Compressed gas flows through pneumatic inlet channel 46, through the open pneumatic inlet valve 42, and into pump chamber 38. The compressed gas displaces the liquid within pump chamber 38 downwards between outer case 12 and discharge pipe 24, into discharge pipe 24 through ports 36, and then up through discharge pipe 24 and out of landfill pump 10 through liquid outlet channel 48 and the liquid outlet 18.

With pneumatic outlet valve 44 in the closed state, the compressed gas within pump chamber 38 is prevented from flowing out of pump chamber 38 through pneumatic outlet channel 50. The closed pneumatic outlet valve 44 can prevent liquid from inadvertently entering into the pneumatic outlet channel 50. It is understood that, in some examples, landfill pump 10 does not include a pneumatic outlet valve 44. Instead, the flow restriction provided by choke 52 still allows pressure to build within pump chamber 38 as compressed gas is admitted through pneumatic inlet valve 42 during the evacuation phase. The bleed rate of the gas through choke 52 is less than the admission rate of the gas through pneumatic inlet valve 42. As such, landfill pump 10 is configured to pump the landfill liquid with or without the pneumatic outlet valve 44.

The evacuation of the liquid causes the liquid level within the pump chamber 38 to lower which correspondingly causes the float 26 to move downward. The float 26 reaching a lower travel limit actuates the valve assembly 32 back to the fill state, which closes the pneumatic inlet valve 42 to prevent further release of pressurize gas into the pump chamber 38. Pneumatic inlet valve 42 shifts back to a closed state and pneumatic outlet valve 44 shifts back to an open state. The pneumatic outlet valve 44 opening fluidly connects the pneumatic outlet channel 50 with pump chamber 38. The pneumatic inlet valve 42 closing shuts off flow of compressed gas into pump chamber 38. The pneumatic outlet valve 44 is actuated to an open state which fluidly connects the pump chamber 38 to the pneumatic outlet channel 50, allowing venting of compressed gas from pump chamber 38. The pneumatic outlet valve 44 opening allows any remaining pressurize gas in the pump chamber 38 to evacuate from pump chamber 38. The compressed gas within pump chamber 38 is bled through choke 52 and landfill liquid can again begin to fill into pump chamber 38 to begin another pump cycle. The landfill pump 10 transitions to the filling phase as liquid can move past the liquid inlet 16, through the liquid inlet valve 30 and into the pump chamber 38 to start the pump cycle once again.

The pressure differential between the interior of pump chamber 38 and the pressure within the landfill well that landfill pump 10 is disposed within can be such that the compressed gas within pump chamber 38 continues to expand even with pneumatic inlet valve 42 closed and pneumatic outlet valve 44 open. The pneumatic outlet valve 44 slowly bleeds the compressed gas from the pump chamber 38 such that the pressure within pump chamber 38 does not equalize immediately on opening of pneumatic outlet valve 44. The continued expansion of the compressed gas within pump chamber 38 can continue to drive the landfill liquid into discharge pipe 24 and out from landfill pump 10 even with the pneumatic inlet valve 42 in the closed state. Such a configuration allows for less compressed gas to be used to evacuate landfill pump 10, providing for cost and energy savings.

Landfill pump 10 provides significant advantages. Choke 52 regulates egress of compressed gas from within pump chamber 38, slowing the outflow of such compressed gas. Slowing the outflow of compressed gas from pump chamber 38 slows filling of the landfill pump 10, providing for slow cycling of the landfill pump 10. Lengthening the fill time for landfill pump 10 and slowing cycling of landfill pump 10 provides for more consistent outflow, facilitating scheduled disposal of the contaminated landfill liquid and reducing operator costs. Landfill pump 10 includes pneumatic outlet valve 44 that closes the flowpath through the pneumatic outlet channel 50 during the evacuation phase, providing for efficient pressurization of the pump chamber 38 and driving of the landfill liquid from the pump chamber 38.

Figure 4:
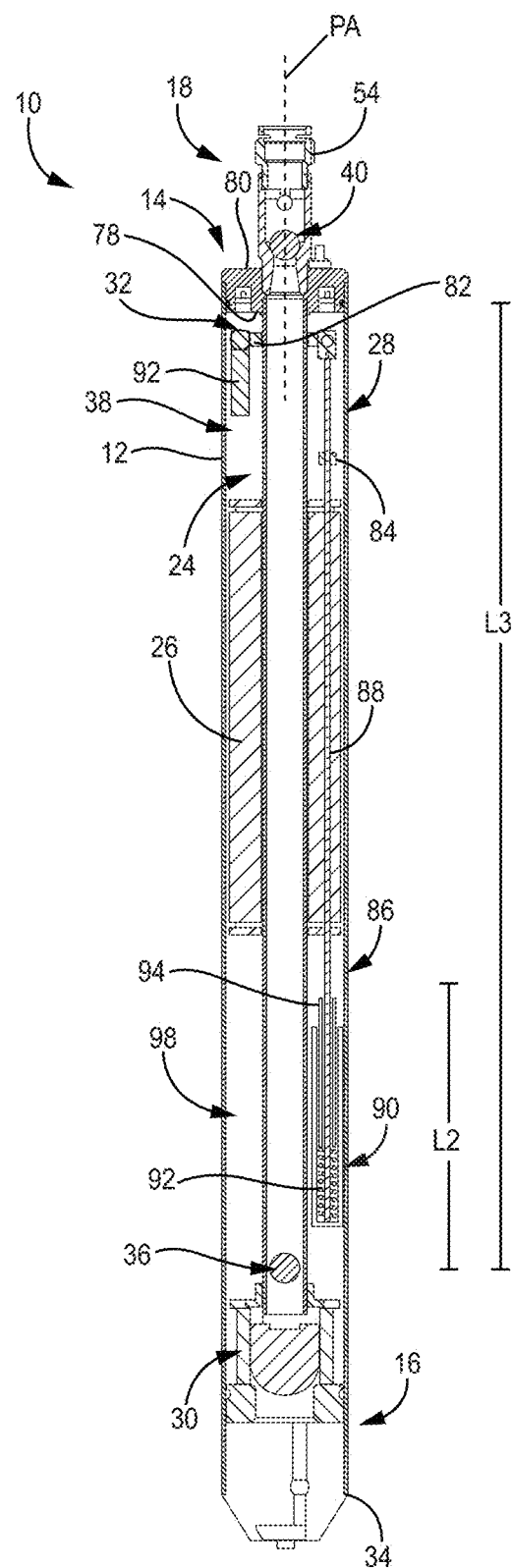
FIG. 4 is a cross-sectional view taken along line 4-4 in FIG. 1.

FIG. 4 is a cross-sectional view of landfill pump 10 taken along line 4-4 in FIG. 1. Outer case 12, manifold 14, liquid inlet 16, liquid outlet 18, discharge pipe 24, float 26, control rod 28, liquid inlet valve 30, valve assembly 32, filter 34, liquid outlet valve 44, liquid outlet channel 48, and liquid fitting 54 of landfill pump 10 are shown. Discharge pipe 24 includes ports 36. Control rod 28 includes upper stop 84, lower stop 86, and guide body 88.

Float 26 is disposed within outer case 12 and is configured to rise and fall with a changing liquid level within landfill pump 10. The float 26 is disposed at least partially around discharge pipe 24 and is configured to move axially relative to discharge pipe 24. Float 26 is configured to move axially along pump axis PA in the example shown, though it is understood that not all examples are so limited. Float 26 is configured to actuate valve assembly 32 between the fill state and the discharge state.

Control rod 28 is connected to valve assembly 32. In the example shown, float 26 is configured to actuate valve assembly 32 between the fill state and the discharge state via control rod 28. Control rod 28 is connected to valve assembly 32 and extends through float 26. In the example shown, control rod 28 is connected to assembly base 82 of valve assembly 32.

Guide body 88 extends from valve assembly 32 and through float 26. Float 26 is movable relative to guide body 88 as float 26 moves within case 12. Upper stop 84 is supported by guide body 88. Upper stop 84 defines an upward travel limit for float 26 along control rod 28. Lower stop 86 is supported by guide body 88. Lower stop 86 defines a downward travel limit for float 26 along control rod 28.

In the example shown, lower stop 86 includes stop housing 90, stop body 94, and stop spring 92. Stop housing 90 is connected to guide body 88. Stop spring 92 is disposed within stop housing 90 and is configured to bias stop body 94 towards float 26. Stop body 94 is at least partially disposed within stop housing 90. Stop body 94 can be biased out of stop body 94 by stop spring 92. The stop body 94 can be configured to telescope relative to stop housing 90 such that float 26 can drive stop body 94 into stop housing 90, thereby compressing stop spring 92, and stop spring 92 can bias stop body 94 out of stop housing 90 as float 26 rises away from lower stop 86 with a rising liquid level.

As can be seen, the valve assembly 32 includes a counterweight 96 which balances the control rod 28. The valve assembly 32 can be pivoted relative to the discharge pipe 24 between the fill state and the discharge state, such as by float 26 shifting control rod 28 by upper stop 84 or lower stop 86. When the valve assembly 32 is tripped to the discharge state, the valve assembly 32 can pivot to allow admission of compressed gags into pump chamber 38 to begin the evacuation phase. When transitioning back to the filling phase, the valve assembly 32 can be tripped to the fill state in which the flow of compressed gas into pump chamber 38 is shut off. The pneumatic outlet valve 44 is open with valve assembly 32 in the fill state. When the valve assembly 32 is tripped to the discharge state, the valve assembly 32 can pivot to close the bleed pathway through pneumatic outlet channel 50 during the evacuation phase. When transitioning back to the filling phase, the valve assembly 32 can be tripped to the fill state in which the compressed gas can vent from the pump chamber 38.

With landfill pump 10 in the filling phase, the float 26 rises with the rising liquid level. The float 26 rises into contact with upper stop 84. Continued rising of the float 26 causes control rod 28 to actuate valve assembly 32 to the discharge state in which the pneumatic inlet valve 42 is opened to cause discharge of the liquid from pump chamber 38. As such, the float 26 can actuate valve assembly 32 to the discharge state by the upper stop 84.

During the evacuation phase, the float 26 falls with the falling liquid level. The counterweight 96 can maintain valve assembly 32 in the fill state as the float 26 disengages from upper stop 84 and begins to fall within outer case 12. The float 26 continues to move downward and comes into contact with the lower stop 86. The float 26 causes control rod 28 to actuate valve assembly 32 back to the fill state by the lower stop 86 to stop admission of compressed gas into pump chamber 38.

In the example shown, the float 26 is configured to contact stop body 94 of lower stop 86. The float 26 can drive the stop body 94 downward against the stop spring 92, compressing the stop spring 92 within the stop housing 90. The stop spring 92 and stop body 94 resist downward movement of the float 26 to slow the float 26 prior to the float 26 reaching the stop housing 90, preventing undesired impact damage from occurring between the float 26 and the lower stop 86.

In the example shown, float 26 can travel along control rod 28 between upper stop 84 and lower stop 86. During the evacuation cycle, the liquid within pump chamber 38 is driven into the discharge pipe 24 through the ports 36 and then up the discharge pipe 24 and out the liquid outlet valve 44. Compressed gas is admitted into pump chamber 38 during the evacuation phase to drive the landfill liquid downward between outer case 12 and discharge pipe 24, into discharge pipe 24 through ports 36, and then up discharge pipe 24 and out of landfill pump 10 through liquid outlet valve 44. Float 26 falls until stopped by lower stop 86, which contact between float 26 and lower stop 86 actuates the valve assembly 32 to the fill state, closing the pneumatic inlet valve 42.

Lower stop 86 spaces float 26 away from ports 36 when valve assembly 32 is actuated to the fill state to stop the inflow of compressed gas to the pump chamber 38. The pressure differential between the interior of pump chamber 38 and the pressure within the wellbore that landfill pump 10 is disposed within can be such that the compressed gas within pump chamber 38 continues to expand even with pneumatic inlet valve 42 closed and pneumatic outlet valve 44 open. The pneumatic outlet valve 44 slowly bleeds the compressed gas from the pump chamber 38 due to choke 52 such that the pressure within pump chamber 38 does not equalize immediately on opening of pneumatic outlet valve 44. The gas expands within an expansion chamber 98 formed between float 26 and ports 36. The expansion chamber 98 is a portion of pump chamber 38 between float 26 and ports 36. Length L2 extends between ports 36 and float 26 when float 26 is at the lower end of travel along control rod 28. Expansion chamber 98 has length L2. Length L3 is between ports 36 and bottom side 78 of manifold 14 and forms a length of pump chamber 38 between manifold 14 and ports 36.

The expansion of the compressed gas within pump chamber 38 after shutting off the inflow of compressed gas to pump chamber 38 can continue to drive the landfill liquid into discharge pipe 24 and out from landfill pump 10. Spacing float 26 away from ports 36 provides an enlarged expansion chamber 98 that provides a greater volumetric area for the gas to expand within. The larger volume of expansion chamber 98 allows the gas to expand to equalize pressure between the pump chamber 38 and wellbore and allow inflow of landfill liquid through liquid inlet valve 30.

The float 26 causes valve assembly 32 to shift to the fill state prior to float 26 reaching the ports 36. The inflow of compressed gas is shut off before the pump chamber 38 has been substantially evacuated. Expansion chamber 98 allows the compressed gas already admitted to pump chamber 38 to expand to continue driving out the landfill liquid even after the valve assembly 32 has transitioned to the fill state. As such, landfill pump 10 can remain in the evacuation phase and continue discharge of landfill liquid without additional inflow of compressed gas.

In the example shown, the expansion chamber 98 has length L2 while the pump chamber 38 has length L3 between ports 36 and manifold 14. As such, the length L3 forms a distance between ports 36 and the top of pump chamber 38. A ratio between the length L2 of the expansion chamber 98 and the length L3 of the pump chamber 38 between ports 36 and manifold 14 can be about 5:1. In some examples, the ratio between length L2 and length L3 can be about 4:1. In some examples, the ratio between length L2 and length L3 can be about 4:1. In some examples, the ratio between length L2 and length L3 can be about 3:1. In some examples, the length L2 can be at least 25 percent of the length L3. In some examples, the length L2 can be at least 30 percent of the length L3. In some examples, the length L2 can be at least 35 percent of the length L3. The ratio between length L2 and length L3 positions float 26 such that expansion chamber 98 can accommodate the expanding gasses prior to such gasses reaching the ports 36 to flow up the discharge pipe 24. The expansion chamber 98 allows the compressed gas to expand and continue driving out liquid without the gas flowing into ports 36 and up through discharge pipe 24 into the discharge line extending from liquid fitting 54, as gas getting into such a discharge line can be disadvantageous.

Restricting downward travel of float 26 to generate expansion chamber 98 provides significant advantages. As discussed above, choke 52 restricts outflow of gasses from pump chamber 38 to slow cycling of landfill pump 10. Downward travel of float 26 is restricted such that float 26 is spaced away from ports 36 by length L2. The expansion chamber 98 can thus accommodate a larger volume of liquid as compared to examples in which the float 26 continues to travel downward to the ports 36. Further, float 26 causes valve assembly 32 to actuate to the fill state sooner, stopping inflow of compressed gas. The expansion chamber 98 allows for expansion of gasses without such gasses exiting through discharge pipe 24. Limiting downward travel of float 26 also causes pneumatic inlet valve 42 to close earlier. The pressurized gasses are restricted from freely exiting through the pneumatic outlet channel 50 and can thus continue to expand to continue driving landfill liquid out of landfill pump 10 even with pneumatic inlet valve 42 in the closed state. Such a configuration allows for less gas use, decreasing costs and wear and increasing operational efficiency.

Figure 5:
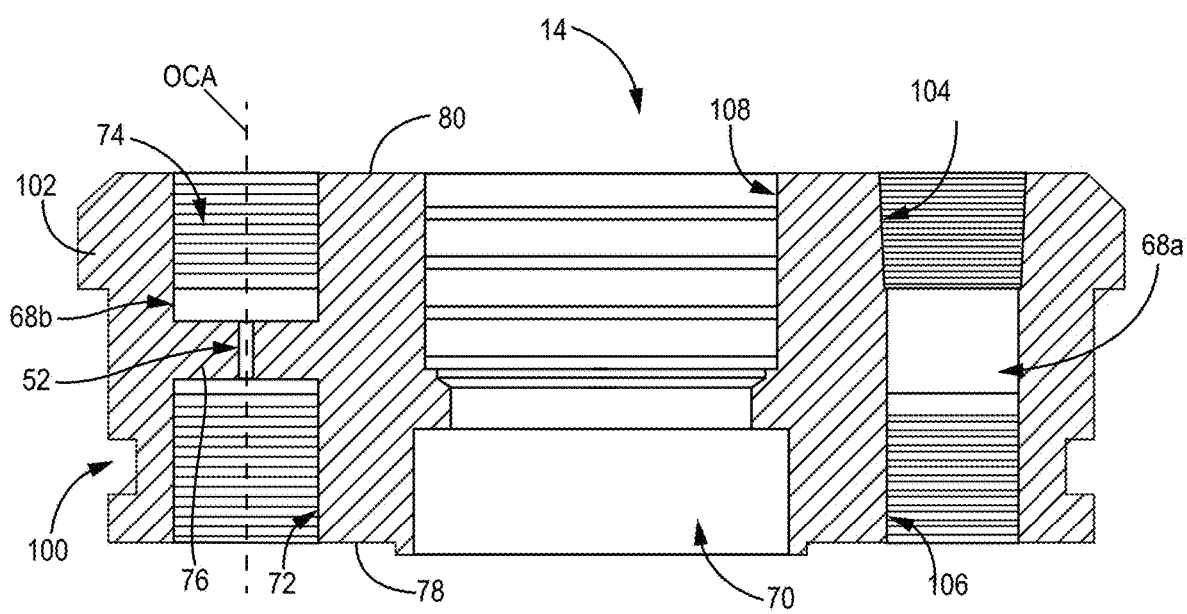
FIG. 5 is a cross-sectional view of a manifold similar to the view shown in FIG. 3B.

FIG. 5 is a cross-sectional view of manifold 14 with various fittings removed. Pneumatic passage 68a, pneumatic passage 68b, liquid passage 70, top side 80, bottom side 78, seal groove 100, manifold cap 102, and bleed barrier 76 of manifold 14 are shown. Inlet fitting bore 104, inlet valve bore 106 of pneumatic passage 68a are shown. Outlet fitting bore 74, outlet valve bore 72, and choke 52 of pneumatic passage 68b are shown.

Manifold 14 is configured to interface with an outer case 12 of a landfill pump 10. Seal groove 100 can support a seal, such as an o-ring seal. Manifold cap 102 can extend over portions of the case 12 to define a limit of insertion of the manifold 14 into the case 12. Pneumatic passage 68a is formed through manifold 14 and open through both the top side 80 and bottom side 78 of manifold 14. Pneumatic passage 68a allows the flow of pressurized gas into pump chamber 38, as discussed previously. Pneumatic inlet channel 46 extends through pneumatic passage 68a.

Inlet fitting bore 104 is open through top side 80 of manifold 14. Inlet fitting bore 104 is configured to interface with pneumatic fitting 56a. In the example shown, the inlet fitting bore 104 is a threaded bore configured to interface with a threaded portion of the pneumatic fitting 56a to connect pneumatic fitting 56a to manifold 14.

Inlet valve bore 106 is open through bottom side 78 of manifold 14. Inlet valve bore 106 is configured to support a portion of pneumatic inlet valve 42. In the example shown, inlet valve bore 106 is configured to support the inlet valve seat 62 of pneumatic inlet valve 42. In the example shown, the inlet valve bore 106 is a threaded bore configured to interface with a threaded portion of the pneumatic inlet valve 42, such as a threaded housing or other support for the inlet valve seat 62, to connect that portion of pneumatic inlet valve 42 to manifold 14.

Pneumatic passage 68b is formed through manifold 14 and open through both the top side 80 and bottom side 78 of manifold 14. Pneumatic passage 68b allows the flow of pressurized gas out from pump chamber 38, as discussed previously.

Outlet fitting bore 74 is open through top side 80 of manifold 14. Outlet fitting bore 74 is configured to interface with pneumatic fitting 56b. In the example shown, the outlet fitting bore 74 is a threaded bore configured to interface with a threaded portion of the pneumatic fitting 56b to connect pneumatic fitting 56b to manifold 14.

Outlet valve bore 72 is open through bottom side 78 of manifold 14. Outlet valve bore 72 is configured to support a portion of pneumatic outlet valve 44. In the example shown, outlet valve bore 72 is configured to support the exhaust fitting 58 that forms the outlet valve seat 66 of pneumatic outlet valve 44. In the example shown, the outlet valve bore 72 is a threaded bore configured to interface with a threaded portion of the exhaust fitting 58 to connect exhaust fitting 58 to manifold 14.

Bleed barrier 76 is disposed in pneumatic passage 68b and defines a narrowing of pneumatic passage 68b. Bleed barrier 76 is disposed axially between outlet fitting bore 74 and outlet valve bore 72 along a channel axis OCA of the pneumatic passage 68b. Bleed barrier 76 defines choke 52 that forms a fluid flowpath between the outlet valve bore 72 and outlet fitting bore 74. Bleed barrier 76 is formed monolithically with other portions of manifold 14, such as with portions of manifold 14 defining other portions of pneumatic passage 68b. It is understood, however, that not all examples are so limited. For example, bleed barrier 76 can be formed separately from manifold 14 and mounted to manifold 14. In one such example, bleed barrier 76 can include exterior threading configured to interface with threading within the pneumatic passage 68b to connect bleed barrier 76, and thus choke 52, to manifold 14.

Choke 52 extends fully axially through bleed barrier 76 along channel axis CA. As shown, the diameter D1 of choke 52 is smaller than the diameter D2 of the largest diameter portion of pneumatic passage 68b. In some examples, diameter D2 is at least twice as large as diameter D1. In some examples, diameter D2 is at least three times as large as diameter D1. In some examples, diameter D2 is at least ten times as large as diameter D1. The restriction provided by choke 52 slows exhaust of gasses from pump chamber 38, thereby slowing ingress of landfill liquid into pump chamber 38 to slow the cycle time of the landfill pump 10.

Liquid passage 70 extends through manifold 14 and is open through top side 80 and bottom side of manifold 14. The liquid being evacuated can flow through the liquid passage 70. In some cases, the discharge pipe 24 can attach to the manifold 14 and another fitting, such as liquid fitting 54, can be attached to the liquid fitting bore 108 of the liquid passage 70.

Figure 6:
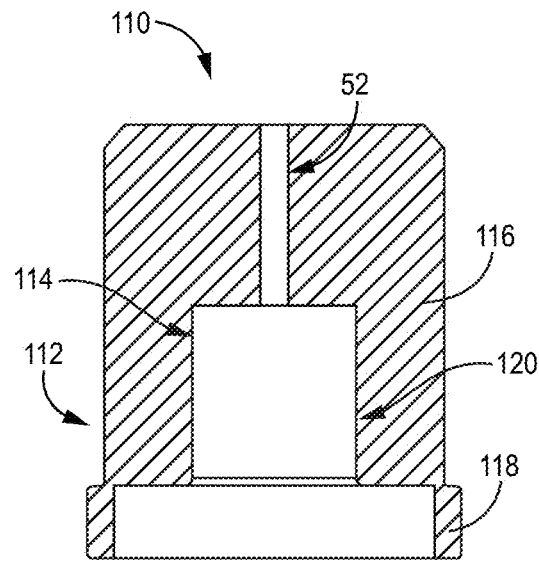
FIG. 6 is a cross-sectional view of an exhaust fitting for a landfill well pump.

FIG. 6 is a cross-sectional view of a bleed piece 110 for a landfill pump, such as landfill pump 10 (best seen in FIGS. 1, 2, 3A, and 4). Bleed piece 110 defines a choke 52 and is formed separately from a manifold of the landfill pump 10. In the example shown, bleed piece 110 is formed as an exhaust fitting substantially similar to exhaust fitting 58 (best seen in FIG. 3B) except that choke 52 is integrated into bleed piece 110. Bleed piece 110 includes fitting body 112 and fitting passage 114. Fitting body 112 includes stem 116 and cap 118. Fitting passage 114 includes receiving chamber 120 and choke 52.

Fitting body 112 defines fitting passage 114. Fitting passage 114 is configured to form a position of the pneumatic outlet channel 50 through which gasses are exhausted from the pump chamber 38 of a landfill pump 10. Receiving chamber 120 of fitting passage 114 is configured such that an outlet valve member 64 of a pneumatic outlet valve 44 can extend into receiving chamber 120 to seal the fitting passage 114 and prevent compressed gas from flowing through fitting passage 114. Portions of fitting body 112 defining receiving chamber 120 can form the outlet valve seat 66 for the pneumatic outlet valve 44. Choke 52 extends from fitting passage 114.

Choke 52 is a narrowing of the fitting passage 114 in the example shown. In the example shown, the choke 52 is formed as a bore through structure of the bleed piece 110. Choke 52 inhibits, but does not stop, the flow of pressurized gas from within the pump chamber 38 out through the pneumatic outlet channel 50. As such, the choke 52 slows down the cycling of the landfill pump 10 because liquid will only enter the pump chamber 38 at near equal pressure with the pressure within the pump chamber 38. If pressurized gas remains in the pump chamber 38 after the evacuation phase, then that residual pressurized gas will slow the ingress of liquid through the liquid inlet 16 and into the pump chamber 38, thus making the filling phase of the pump cycle longer. This has the overall effect of slowing the cycling of the landfill pump 10 which can be advantageous for applications when low cycling and low flow is desired.

Stem 116 extends from cap 118. Stem 116 is configured to extend into a manifold, similar to manifold 14 but without an integrated choke 52, to connect bleed piece 110 to the manifold. Bleed piece 110 is configured to mount to the manifold and restrict the exhaust of gasses out from the landfill pump 10. For example, bleed piece 110 can be connected to the manifold by an interface between the fitting body 112 and the manifold. For example, stem 116 can include exterior threading configured to interface with interior threading within a bore in the manifold. It is understood, however, that stem 116 can be mounted to manifold in any desired manner, such as by a press fit connection, a bayonet connection, a threaded connection, among other options. Manifolds having bleed piece 110 do not require an integrated choke. Instead, bleed piece 110 includes choke 52 that restricts flow of exhaust gasses from the pump chamber 38. Choke 52 can form the narrowest diameter portion of a pneumatic outlet channel 50 that exhausts gasses from an interior pump chamber 38 of a landfill pump 10.

Bleed piece 110 provides significant advantages. Choke 52 is integrated into bleed piece 110 that can be mounted to a manifold. Choke 52 restricts outflow of compressed gas from the pump chamber 38, thereby slowing the cycle time of the landfill pump 10. Bleed piece 110 can be installed on an existing manifold to provide restricted cycling to the landfill pump including such a manifold. As such, existing landfill pumps can be retrofit by installation of bleed piece 110 to provide efficient and steady cycling of the landfill pump. Further, bleed piece 110 can be removable from pump cap 118, facilitating easy removal for replacement or cleaning of choke 52.

FIG. 6 is a cross-sectional view of a bleed piece 110 for a landfill pump, such as landfill pump 10 (best seen in FIGS. 1, 2, 3A, and 4). Bleed piece 110 defines a choke 52 and is formed separately from a manifold of the landfill pump 10. In the example shown, bleed piece 110 is formed as an exhaust fitting substantially similar to exhaust fitting 58 (best seen in FIG. 3B) except that choke 52 is integrated into bleed piece 110. Bleed piece 110 includes fitting body 112 and fitting passage 114. Fitting body 112 includes stem 116 and cap 118. Fitting passage 114 includes receiving chamber 120 and choke 52.

Fitting body 112 defines fitting passage 114. Fitting passage 114 is configured to form a position of the pneumatic outlet channel 50 through which gasses are exhausted from the pump chamber 38 of a landfill pump 10. Receiving chamber 120 of fitting passage 114 is configured such that an outlet valve member 64 of a pneumatic outlet valve 44 can extend into receiving chamber 120 to seal the fitting passage 114 and prevent compressed gas from flowing through fitting passage 114. Portions of fitting body 112 defining receiving chamber 120 can form the outlet valve seat 66 for the pneumatic outlet valve 44. Choke 52 extends from fitting passage 114.

Choke 52 is a narrowing of the fitting passage 114 in the example shown. In the example shown, the choke 52 is formed as a bore through structure of the bleed piece 110. Choke 52 inhibits, but does not stop, the flow of pressurized gas from within the pump chamber 38 out through the pneumatic outlet channel 50. As such, the choke 52 slows down the cycling of the landfill pump 10 because liquid will only enter the pump chamber 38 at near equal pressure with the pressure within the pump chamber 38. If pressurized gas remains in the pump chamber 38 after the evacuation phase, then that residual pressurized gas will slow the ingress of liquid through the liquid inlet 16 and into the pump chamber 38, thus making the filling phase of the pump cycle longer. This has the overall effect of slowing the cycling of the landfill pump 10 which can be advantageous for applications when low cycling and low flow is desired.

Stem 116 extends from cap 118. Stem 116 is configured to extend into a manifold, similar to manifold 14 but without an integrated choke 52, to connect bleed piece 110 to the manifold. Bleed piece 110 is configured to mount to the manifold and restrict the exhaust of gasses out from the landfill pump 10. For example, bleed piece 110 can be connected to the manifold by an interface between the fitting body 112 and the manifold. For example, stem 116 can include exterior threading configured to interface with interior threading within a bore in the manifold. It is understood, however, that stem 116 can be mounted to manifold in any desired manner, such as by a press fit connection, a bayonet connection, a threaded connection, among other options. Manifolds having bleed piece 110 do not require an integrated choke. Instead, bleed piece 110 includes choke 52 that restricts flow of exhaust gasses from the pump chamber 38. Choke 52 can form the narrowest diameter portion of a pneumatic outlet channel 50 that exhausts gasses from an interior pump chamber 38 of a landfill pump 10.

Bleed piece 110 provides significant advantages. Choke 52 is integrated into bleed piece 110 that can be mounted to a manifold. Choke 52 restricts outflow of compressed gas from the pump chamber 38, thereby slowing the cycle time of the landfill pump 10. Bleed piece 110 can be installed on an existing manifold to provide restricted cycling to the landfill pump including such a manifold. As such, existing landfill pumps can be retrofit by installation of bleed piece 110 to provide efficient and steady cycling of the landfill pump. Further, bleed piece 110 can be removable from pump cap 118, facilitating easy removal for replacement or cleaning of choke 52.

Figure 7:
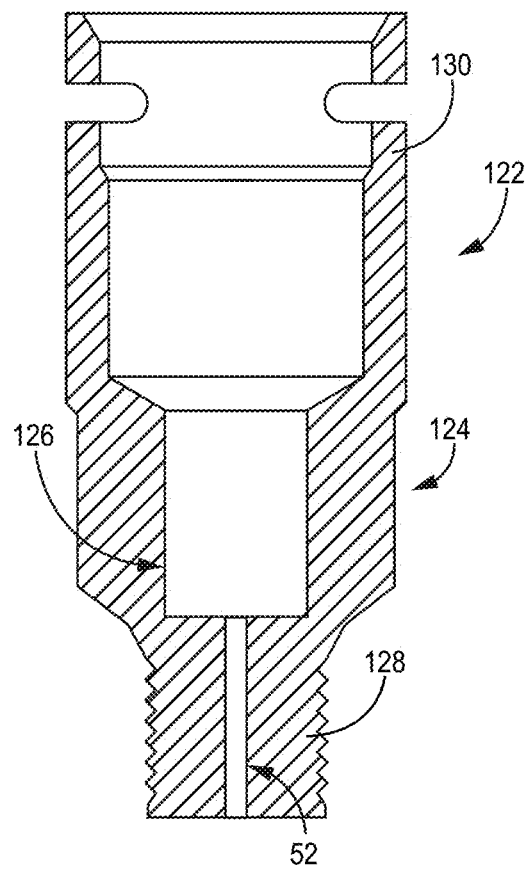
FIG. 7 is a cross-sectional view of a pneumatic fitting for a landfill well pump.

FIG. 7 is a cross-sectional view of a bleed piece 122 for a landfill pump, such as landfill pump 10 (best seen in FIGS. 1, 2, 3A, and 4). Bleed piece 122 is substantially similar to bleed piece 110 (FIG. 6) in that bleed piece 122 includes an integrated choke 52 and is formed separately from the manifold of the landfill pump 10. Bleed piece 122 includes fitting body 124 and fitting passage 126. Fitting body 124 includes mount end 128 and outer end 130. Fitting passage 126 includes choke 52.

Fitting body 124 defines fitting passage 126. Fitting passage 126 is configured to form a position of the pneumatic outlet channel 50 through which gasses are exhausted from the pump chamber 38 of a landfill pump 10. Choke 52 forms a portion of the fitting passage 126.

Choke 52 is a narrowing of the fitting passage 126 in the example shown. In the example shown, the choke 52 is formed as a bore through structure of the bleed piece 122. Choke 52 inhibits, but does not stop, the flow of pressurized gas from within the pump chamber 38 out through the pneumatic outlet channel 50. As such, the choke 52 slows down the cycling of the landfill pump 10 because liquid will only enter the pump chamber 38 at near equal pressure with the pressure within the pump chamber 38.

Mount end 128 is configured to interface with a manifold, similar to manifold 14 but without an integrated choke 52, to connect to the manifold. Outer end 130 is disposed at an opposite end of fitting body 124 from mount end 128. Outer end 130 is configured to interface with a hose such that bleed piece 122 can output gasses to the hose. It is understood that, in some examples, the outer end 130 may not be connected to a hose such that gasses are exhausted through bleed piece 122 and directly into the wellbore within which the landfill pump 10 is disposed.

Bleed piece 122 is configured to mount to a manifold and restrict the exhaust of gasses from the landfill pump. Bleed piece 122 is configured to mount to the pneumatic outlet channel 50 of the manifold, such as in place of pneumatic fitting 56b (best seen in FIG. 3B). For example, bleed piece 122 can be connected to the manifold by an interface between the fitting body 124 and the manifold. For example, mount end 128 can include exterior threading configured to interface with interior threading within a bore through the manifold. It is understood, however, that mount end 128 can be mounted to the manifold in any desired manner, such as by a press fit connection, a bayonet connection, a threaded connection, among other options. Manifolds having bleed piece 122 do not require an integrated choke. Instead, bleed piece 122 includes choke 52 that restricts flow of exhaust gasses from the pump chamber 38. Choke 52 can form the narrowest diameter portion of the pneumatic outlet channel 50.

Bleed piece 122 provides significant advantages. Choke 52 is integrated into bleed piece 122 that can be removably mounted to a manifold. Choke 52 restricts outflow of compressed gas from the pump chamber 38, thereby slowing the cycle time of the landfill pump 10. Bleed piece 122 can be installed on an existing manifold to provide restricted cycling to the landfill pump including such a manifold. As such, existing landfill pumps can be retrofit by installation of bleed piece 122 to provide efficient and steady cycling of the landfill pump. Further, bleed piece 122 can be removable from the manifold, facilitating easy removal for replacement or cleaning of choke 52.

Figure 8:
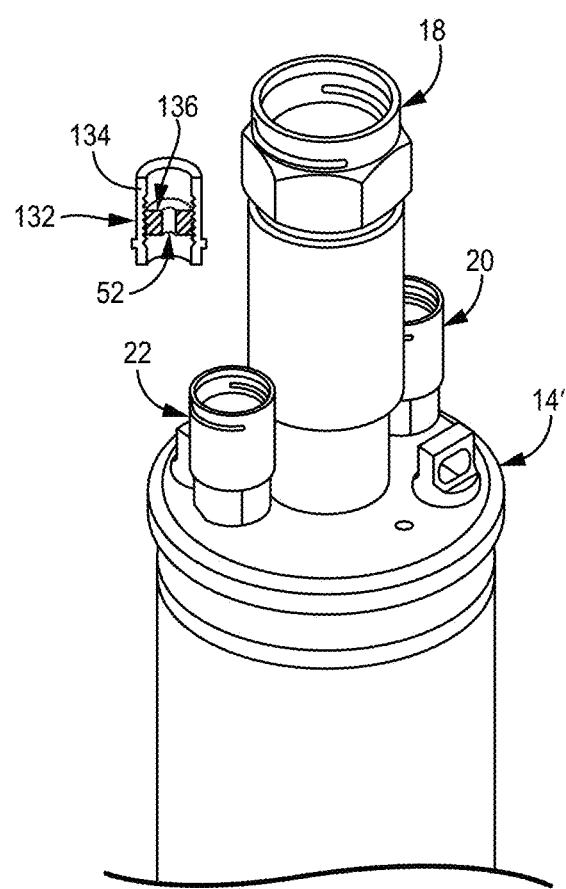
FIG. 8 is an enlarged isometric view a landfill pump showing a bleed piece in cross-section and exploded away from the landfill pump.

FIG. 8 is an enlarged isometric view of a manifold 14' showing a bleed piece 132 exploded away from the manifold 14'. Bleed piece 132 is substantially similar to bleed piece 110 (FIG. 6) and bleed piece 122 (FIG. 7) in that bleed piece 132 includes choke 52 that restricts flow of gasses through bleed piece 132 which choke 52 is not integrated into the manifold 14'. Bleed piece 132 includes bleed housing 134 and bleed barrier 136. Choke 52 is formed through bleed barrier 136. Bleed housing 134 can be mounted to manifold 14', such as within a pneumatic outlet passage, similar to pneumatic passage 68b of manifold 14. In some examples, bleed piece 132 can be mounted to a fitting connected to the manifold 14', such as to pneumatic fitting 68b. Bleed housing 134 can be configured to mount in any desired manner, such as by interfaced threading, bayonet connection, press fit, etc.

Bleed barrier 136 is connected to bleed housing 134. In some examples, bleed barrier 136 can be formed monolithically with bleed housing 134. In the example shown, bleed barrier 136 is connected to bleed housing 134 by interfaced threading therebetween. Bleed barrier 136 is separably connected to bleed housing 134 in the examples shown. In the example shown, bleed barrier 136 can be considered to form a set screw having an aperture therethrough that forms choke 52. Choke 52 is formed through bleed barrier 136.

In some examples, bleed barrier 136 is removable from bleed housing 134 and replaceable. A plurality of different bleed barriers 136 having respective apertures of different sizes to form differently sized chokes 52 can be selectively placed within the bleed housing 134 to allow customization on the throttling of venting to adjust cycling rate of the landfill pump. In this way, the choke 52 can still be located within the wellbore to appropriately bleed pressurized gas from the pump chamber 38 of the landfill pump, while not being integrated inside of the manifold 14'.

While the invention(s) has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention(s) without departing from the essential scope thereof. Therefore, it is intended that the invention(s) not be limited to the particular embodiment(s) disclosed, but that the invention(s) may include all embodiments falling within the scope of the appended claims. Any single feature, or any combination of features from one embodiment show herein, may be utilized in a different embodiment independent from the other features shown in the embodiment herein. Accordingly, the scope of the invention(s) and any claims thereto are not limited to the particular to the embodiments and/or combinations of the features shown herein, but rather can include any combination of one, two, or more features shown herein.

The invention claimed is:

1. A landfill pump for pumping a liquid out of a wellbore in a landfill, the landfill pump comprising:
    a case, the case being cylindrical and elongated along a pump axis;
    a pump chamber located at least partially within the case;
    a liquid inlet, the liquid inlet configured to permit the liquid to flow from outside of the landfill pump into the pump chamber;
    a liquid inlet valve that opens to allow the liquid to flow from the liquid inlet into the pump chamber and closes to block the liquid in the pump chamber from flowing back out of the liquid inlet;
    a liquid outlet channel through which the liquid is discharged;
    a liquid outlet valve that opens to allow the liquid to flow out of the pump chamber through the liquid outlet channel and closes to block the liquid from flowing through the liquid outlet channel and back into the pump chamber;
    a discharge pipe that extends axially within the casing and within the pump chamber, the liquid outlet channel extending at least partially within the discharge pipe, and the discharge pipe including at least one port formed therethrough;
    a pneumatic inlet channel which routes a compressed gas into the pump chamber to drive the liquid out from the pump chamber through the liquid outlet channel;
    a pneumatic outlet channel configured to vent the compressed gas from the pump chamber during a filling phase, in which during the filling phase the liquid flows through the liquid inlet into the pump chamber;
    a manifold within which each of the liquid outlet channel and the pneumatic outlet channel extend, the manifold disposed at an upper end of the case;
    a valve assembly configured to regulate flow of the compressed gas into the pump chamber to force the liquid downward within the pump chamber and then upward through the discharge pipe and out through the liquid outlet channel, the valve assembly including:
        a pneumatic inlet valve which blocks the pneumatic inlet channel during filling of liquid into the pump chamber through the liquid inlet and that is moved to not block the pneumatic inlet channel during admission of the compressed gas to the pump chamber through the pneumatic inlet channel to drive the liquid out from the pump chamber through the discharge pipe and the liquid outlet channel; and
        a pneumatic outlet valve that blocks the pneumatic outlet channel during the admission of the compressed gas to the pump chamber through the pneumatic inlet valve and that is moved to allow pneumatic flow through the pneumatic outlet channel during the filling phase;
    a float that rises and falls within the pump chamber in response to changing levels of the liquid within the pump chamber, such movement of the float actuating the valve assembly between the filling phase and an evacuation phase of a pump cycle in which during the evacuation phase the valve assembly causes release of the compressed gas into the pump chamber to force the liquid within the pump chamber up through the discharge pipe and out through the liquid outlet channel, the valve assembly admitting the compressed gas from the pneumatic inlet channel into the pump chamber during the evacuation phase and the valve assembly blocking the admission of the compressed gas from the pneumatic inlet channel into the pump chamber during the filling phase; and a choke fluidly connected with the pneumatic outlet channel and disposed within the manifold;

wherein the choke is disposed downstream of and spaced away from an outlet valve seat of the pneumatic outlet valve; and wherein the pneumatic outlet channel is wider than the choke both upstream of the choke within the manifold and downstream of the choke within the manifold.

2. The landfill pump of claim 1, wherein the choke is formed by the manifold.

3. The landfill pump of claim 1, wherein the choke is mounted on the manifold.

4. The landfill pump of claim 3, wherein the choke is located within a bleed piece attached to the manifold.

5. The landfill pump of claim 4, wherein the bleed piece includes a bleed barrier which forms the choke.

6. A landfill pump for pumping a liquid out of a wellbore in a landfill, the landfill pump comprising:
a case, the case being cylindrical and elongated along a pump axis;
a pump chamber located at least partially within the case;
a liquid inlet, the liquid inlet configured to permit the liquid to flow from outside of the landfill pump into the pump chamber;
a liquid inlet valve that opens to allow the liquid to flow from the liquid inlet into the pump chamber and closes to block the liquid in the pump chamber from flowing back out of the liquid inlet;
a liquid outlet channel through which the liquid is discharged;
a liquid outlet valve that opens to allow the liquid to flow out of the pump chamber through the liquid outlet channel and closes to block the liquid from flowing through the liquid outlet channel and back into the pump chamber;
a discharge pipe that extends axially within the casing and within the pump chamber, the liquid outlet channel extending at least partially within the discharge pipe, and the discharge pipe including at least one port formed therethrough;
a pneumatic inlet channel which routes a compressed gas into the pump chamber to drive the liquid out from the pump chamber through the liquid outlet channel;
a valve assembly configured to regulate flow of the compressed gas into the pump chamber to force the liquid downward within the pump chamber and then upward through the discharge pipe and out through the liquid outlet channel, the valve assembly including:
a pneumatic inlet valve which blocks the pneumatic inlet channel during filling of liquid into the pump chamber through the liquid inlet and that is moved to not block the pneumatic inlet channel during admission of the compressed gas to the pump chamber through the pneumatic inlet channel to drive the liquid out from the pump chamber through the discharge pipe and the liquid outlet channel;
a float that rises and falls within the pump chamber in response to changing levels of the liquid within the pump chamber, such movement of the float actuating the valve assembly between a filling phase and an evacuation phase of a pump cycle in which during the filling phase the liquid flows through the liquid inlet into the pump chamber and during the evacuation phase the valve assembly causes release of the compressed gas into the pump chamber to force the liquid within the pump chamber up through the discharge pipe and out through the liquid outlet channel, the valve assembly admitting the compressed gas from the pneumatic inlet channel into the pump chamber during the evacuation phase and the valve assembly blocking the admission of the compressed gas from the pneumatic inlet channel into the pump chamber during the filling phase a pneumatic outlet channel configured to vent the compressed gas from the pump chamber during the filling phase; and a choke fluidly connected with the pneumatic outlet channel; and a manifold within which each of the liquid outlet channel and the pneumatic outlet channel extend, the manifold disposed at an upper end of the case;

wherein the choke is located within a bleed piece attached to the manifold, and the bleed piece includes a bleed barrier which forms the choke; and wherein the bleed barrier is separatable from a bleed housing of the bleed piece.

7. The landfill pump of claim 3, wherein the choke is connected to the manifold by interfaced threading.

8. The landfill pump of claim 1, wherein an inner diameter of the choke is up to 0.2 inches and the inner diameter of the choke is narrower than an inner diameter of the pneumatic outlet channel such that the inner diameter of the pneumatic outlet channel along all of a length of the pneumatic outlet channel is wider than the inner diameter of the choke.

9. The landfill pump of claim 1, further comprising a control rod interfacing with the float, wherein the float is configured to rise within the pump chamber with a rising liquid level to cause the control rod to actuate the valve assembly to the evacuation phase, and the float is configured to fall within the pump chamber with a falling liquid level to cause the control rod to actuate the valve assembly to the filling phase.

10. A landfill pump for pumping a liquid out of a wellbore in a landfill, the landfill pump comprising:
a case, the case being cylindrical and elongated along a pump axis;
a pump chamber located at least partially within the case;
a liquid inlet, the liquid inlet configured to permit the liquid to flow from outside of the landfill pump into the pump chamber;
a liquid inlet valve that opens to allow the liquid to flow from the liquid inlet into the pump chamber and closes to block the liquid in the pump chamber from flowing back out of the liquid inlet;
a liquid outlet channel through which the liquid is discharged;
a liquid outlet valve that opens to allow the liquid to flow out of the pump chamber through the liquid outlet channel and closes to block the liquid from flowing through the liquid outlet channel and back into the pump chamber;
a discharge pipe that extends axially within the casing and within the pump chamber, the liquid outlet channel extending at least partially within the discharge pipe, and the discharge pipe including at least one port formed therethrough;

a pneumatic inlet channel which routes a compressed gas into the pump chamber to drive the liquid out from the pump chamber through the liquid outlet channel;

a valve assembly configured to regulate flow of the compressed gas into the pump chamber to force the liquid downward within the pump chamber and then upward through the discharge pipe and out through the liquid outlet channel, the valve assembly including:
  a pneumatic inlet valve which blocks the pneumatic inlet channel during filling of liquid into the pump chamber through the liquid inlet and that is moved to not block the pneumatic inlet channel during admission of the compressed gas to the pump chamber through the pneumatic inlet channel to drive the liquid out from the pump chamber through the discharge pipe and the liquid outlet channel;

a float that rises and falls within the pump chamber in response to changing levels of the liquid within the pump chamber, such movement of the float actuating the valve assembly between a filling phase and an evacuation phase of a pump cycle in which during the filling phase the liquid flows through the liquid inlet into the pump chamber and during the evacuation phase the valve assembly causes release of the compressed gas into the pump chamber to force the liquid within the pump chamber up through the discharge pipe and out through the liquid outlet channel, the valve assembly admitting the compressed gas from the pneumatic inlet channel into the pump chamber during the evacuation phase and the valve assembly blocking the admission of the compressed gas from the pneumatic inlet channel into the pump chamber during the filling phase a pneumatic outlet channel configured to vent the compressed gas from the pump chamber during the filling phase;

a choke located fluidly connected with pneumatic outlet channel; and a control rod interfacing with the float, wherein the float is configured to rise within the pump chamber with a rising liquid level to cause the control rod to actuate the valve assembly to the evacuation phase, and the float is configured to fall within the pump chamber with a falling liquid level to cause the control rod to actuate the valve assembly to the filling phase;

wherein the discharge pipe includes at least one side port formed therethrough;

wherein the pump chamber includes an evacuation chamber disposed axially between the lower stop and the at least one side port;

wherein the evacuation chamber has a first axial length and the pump chamber has a second axial length between the at least one side port and the liquid outlet channel; and wherein the first axial length is at least one quarter of the second axial length to provide volume for the compressed gas admitted to the pump chamber to expand and continue driving the liquid out from the pump chamber after actuation of the valve assembly to the filling phase.

11. A landfill pump for pumping a liquid out of a wellbore in a landfill, the landfill pump comprising:
  a case, the case being cylindrical and elongated along a pump axis;
  a pump chamber located at least partially within the case;
  a manifold disposed at a top end of the case;
  a liquid inlet, the liquid inlet configured to permit the liquid to flow from outside of the landfill pump within the wellbore and into the pump chamber;
  a liquid inlet valve that opens to allow the liquid to flow from the liquid inlet into the pump chamber and closes to block the liquid in the pump chamber from flowing back out of the liquid inlet;
  a liquid outlet channel at least partially formed through the manifold and through which the liquid is discharged;
  a liquid outlet valve that opens to allow the liquid to flow out of the pump chamber through the liquid outlet channel and closes to block the liquid from flowing through the liquid outlet channel and back into the pump chamber;
  a discharge pipe that extends axially within the casing and within the pump chamber, the liquid outlet channel extending at least partially within the discharge pipe;
  a valve assembly configured to regulate flow of a compressed gas into the pump chamber to force the liquid within the pump chamber out through the liquid outlet channel, the valve assembly including:
    a pneumatic outlet valve that blocks a pneumatic outlet channel during admission of the compressed gas to the pump chamber and that is moved to allow pneumatic flow through the pneumatic outlet channel during filling of the liquid into the pump chamber; and
    a pneumatic inlet valve that blocks a pneumatic inlet channel during filling of the liquid into the pump chamber and that is moved to unblock the pneumatic inlet channel and allow admission of the compressed gas to the pump chamber;
  a float that rises and falls within the pump chamber in response to changing levels of the liquid within the pump chamber, such movement of the float actuating the valve assembly between a fill state and a discharge state, the pneumatic inlet valve admitting the compressed gas into the pump chamber in the discharge state and the pneumatic inlet valve blocking the admission of the compressed gas into the pump chamber in the fill state;
  a control rod interfacing with the float, wherein the float is configured to rise within the pump chamber with a rising liquid level to cause the control rod to actuate the valve assembly to the discharge state, and the float is configured to fall within the pump chamber with a falling liquid level to cause the control rod to actuate the valve assembly to the fill state; and
  wherein a pneumatic outlet channel is configured to vent the compressed gas from the pump chamber;
  wherein a choke is fluidly connected with the pneumatic outlet channel;
  wherein the landfill pump is configured to undergo a plurality of pump cycles, each pump cycle comprising a filling phase in which the liquid flows through the liquid inlet into the pump chamber and an evacuation phase in which the valve assembly causes release of the compressed gas into the pump chamber to force the liquid out through the liquid outlet channel;
  wherein the choke is formed in a bleed piece connected to the manifold;
  wherein the bleed piece includes an inner end oriented towards the pump chamber, an outer end oriented away from the pump chamber, and a fitting passage extending through the inner end and the outer end;

wherein the choke is formed as a portion of the fitting passage, and the fitting passage widens downstream of the choke between the choke and the outer end; and wherein the choke is narrower than an outlet valve seat of the pneumatic outlet valve.

12. The landfill pump of claim 11, wherein the bleed piece is connected to the manifold through a top side of the manifold that is oriented away from the pump chamber.

13. The landfill pump of claim 12, wherein the bleed piece forms a pneumatic fitting connected to the manifold, the pneumatic fitting is configured to connect to an exhaust hose extending from the landfill pump.

14. The landfill pump of claim 12, wherein the choke is formed as a bore through structure of the bleed piece.

15. A landfill pump for pumping a liquid out of a wellbore in a landfill, the landfill pump comprising:

a case, the case being cylindrical and elongated along a pump axis;

a pump chamber located at least partially within the case;

a manifold disposed at a top end of the case;

a liquid inlet, the liquid inlet configured to permit the liquid to flow from outside of the landfill pump within the wellbore and into the pump chamber;

a liquid inlet valve that opens to allow the liquid to flow from the liquid inlet into the pump chamber and closes to block the liquid in the pump chamber from flowing back out of the liquid inlet;

a liquid outlet channel at least partially formed through the manifold and through which the liquid is discharged;

a liquid outlet valve that opens to allow the liquid to flow out of the pump chamber through the liquid outlet channel and closes to block the liquid from flowing through the liquid outlet channel and back into the pump chamber;

a discharge pipe that extends axially within the casing and within the pump chamber, the liquid outlet channel extending at least partially within the discharge pipe;

a valve assembly configured to regulate flow of a compressed gas into the pump chamber to force the liquid within the pump chamber out through the liquid outlet channel, the valve assembly including:

a pneumatic inlet valve which blocks the flow of compressed gas into the pump chamber during filling of liquid into the pump chamber through the liquid inlet and that is moved to not block the flow of compressed gas into the pump chamber during admission of the compressed gas to the pump chamber through the pneumatic inlet channel to drive the liquid out from the pump chamber through the discharge pipe and the liquid outlet channel;

a float that rises and falls within the pump chamber in response to changing levels of the liquid within the pump chamber, such movement of the float actuating the valve assembly between a fill state and a discharge state, the valve assembly admitting the compressed gas into the pump chamber in the discharge state and the valve assembly blocking the admission of the compressed gas into the pump chamber in the fill state;

a control rod interfacing with the float, wherein the float is configured to rise within the pump chamber with a rising liquid level to cause the control rod to actuate the valve assembly to the discharge state, and the float is configured to fall within the pump chamber with a falling liquid level to cause the control rod to actuate the valve assembly to the fill state; and a pneumatic outlet channel configured to vent the compressed gas from the pump chamber, wherein a choke is fluidly connected with the pneumatic outlet channel to slow cycling of the landfill pump by slowing egress of the compressed gas from the pump chamber and consequently slow ingress of the liquid into the pump chamber;

wherein the landfill pump is configured to undergo a plurality of pump cycles, each pump cycle comprising a filling phase in which the liquid flows through the liquid inlet into the pump chamber and an evacuation phase in which the valve assembly causes release of the compressed gas into the pump chamber to force the liquid out through the liquid outlet channel;

wherein the choke is formed in a bleed piece connected to the manifold; and wherein the bleed piece includes a bleed housing and a bleed barrier through which the choke is formed, the bleed barrier separably connected to the bleed housing.

16. The landfill pump of claim 15, wherein the bleed barrier is connected to the bleed housing by interfaced threading.

17. A landfill pump for pumping a liquid out of a wellbore in a landfill, the landfill pump comprising:

a case, the case being cylindrical and elongated along a pump axis;

a pump chamber located at least partially within the case;

a manifold disposed at a top end of the case;

a liquid inlet, the liquid inlet configured to permit the liquid to flow from outside of the landfill pump within the wellbore and into the pump chamber;

a liquid inlet valve that opens to allow the liquid to flow from the liquid inlet into the pump chamber and closes to block the liquid in the pump chamber from flowing back out of the liquid inlet;

a liquid outlet channel at least partially formed through the manifold and through which the liquid is discharged;

a liquid outlet valve that opens to allow the liquid to flow out of the pump chamber through the liquid outlet channel and closes to block the liquid from flowing through the liquid outlet channel and back into the pump chamber;

a discharge pipe that extends axially within the casing and within the pump chamber, the liquid outlet channel extending at least partially within the discharge pipe;

a valve assembly configured to regulate flow of a compressed gas into the pump chamber to force the liquid within the pump chamber out through the liquid outlet channel, the valve assembly including a pneumatic inlet valve that blocks a pneumatic inlet channel during filling of the liquid into the pump chamber and that is moved to unblock the pneumatic inlet channel during admission of the compressed gas to the pump chamber;

a float that rises and falls within the pump chamber in response to changing levels of the liquid within the pump chamber, such movement of the float actuating the valve assembly between a fill state and a discharge state, the valve assembly admitting the compressed gas into the pump chamber in the discharge state and the valve assembly blocking the admission of the compressed gas into the pump chamber in the fill state;

a control rod interfacing with the float, wherein the float is configured to rise within the pump chamber with a rising liquid level to cause the control rod to actuate the valve assembly to the discharge state, and the float is configured to fall within the pump chamber with a falling liquid level to cause the control rod to actuate the valve assembly to the fill state; and wherein a pneumatic outlet channel is configured to vent the compressed gas from the pump chamber, wherein a choke is fluidly connected with the pneumatic outlet channel;

wherein the landfill pump is configured to undergo a plurality of pump cycles, each pump cycle comprising a filling phase in which the liquid flows through the liquid inlet into the pump chamber and an evacuation phase in which the valve assembly causes release of the compressed gas into the pump chamber to force the liquid out through the liquid outlet channel;

wherein the choke is formed in a bleed piece connected to the manifold;

wherein the bleed piece includes an inner end oriented towards the pump chamber, an outer end oriented away from the pump chamber, and a fitting passage extending through the inner end and the outer end;

wherein the choke is formed as a portion of the fitting passage, and the fitting passage is wider than the choke upstream of the choke between the choke and the inner end.

\* \* \* \* \*